(12) United States Patent
Williams

(10) Patent No.: US 7,415,107 B1
(45) Date of Patent: Aug. 19, 2008

(54) TELEPHONE CALL INFORMATION DELIVERY SYSTEM

(76) Inventor: Christopher Guy Williams, 3135 E. 11th, Spokane, WA (US) 99202

( * ) Notice: Subject to any disclaimer, the term of this patent is extended or adjusted under 35 U.S.C. 154(b) by 0 days.

(21) Appl. No.: 11/337,860

(22) Filed: Jan. 23, 2006

Related U.S. Application Data

(63) Continuation of application No. 10/185,626, filed on Jul. 1, 2002, now Pat. No. 7,062,036.

(51) Int. Cl.
*H04M 1/00* (2006.01)
(52) U.S. Cl. .................... 379/373.01; 379/67.1
(58) Field of Classification Search .............. None
See application file for complete search history.

(56) References Cited

U.S. PATENT DOCUMENTS

| | | | | |
|---|---|---|---|---|
| 4,823,380 A | * | 4/1989 | Kohen et al. ........... 379/387.02 |
| 4,866,766 A | * | 9/1989 | Mitzlaff ................. 379/373.02 |
| 5,687,227 A | * | 11/1997 | Cohrs et al. ............ 379/374.02 |
| 5,949,854 A | * | 9/1999 | Sato ........................ 379/88.16 |
| 6,255,937 B1 | * | 7/2001 | Hamaguchi .............. 340/384.7 |
| 6,901,266 B2 | * | 5/2005 | Henderson ................. 455/462 |

* cited by examiner

*Primary Examiner*—Ramnandan Singh

(57) ABSTRACT

A telephone call information delivery system includes answering circuitry to answer a telephone call incoming from a service provider and to attain information input by a caller. The system further includes an information signal provider to provide at least one signal to deliver at least some of the attained information to a user. As an example, from the delivered information the user can decide whether or not to answer the incoming call. In another embodiment, the system further includes an alert signal provider to provide a signal to alert the user and an activator to receive instruction from the user. The information signal provider operates responsive to the activator. This embodiment answers an incoming call, attains information from the caller, alerts the user, the user then instructs the activator and the signal provider responds and delivers attained information to the user. The user then decides whether to answer the call.

18 Claims, 11 Drawing Sheets

TELEPHONE CALL INFORMATION DELIVERY SYSTEM

CROSS REFERENCE TO RELATED APPLICATIONS

This application is a continuation of U.S. patent application Ser. No. 10/185,626, filed Jul. 1, 2002, now U.S. Pat. No. 7,062,036, which in turn claims priority to U.S. patent application Ser. No. 09/499,652, filed on Feb. 8, 2000 and entitled Communication Call Information Delivery System, which in turn claims priority to U.S. Provisional Application Ser. No. 60/118,971 filed Feb. 6, 1999 and entitled Telephone Call Directing System, which is hereby incorporated by reference herein in its entirety.

FIELD OF THE INVENTION

This invention relates to systems and methods to receive information from a telephone caller and deliver that information to the called party (user). The called party can then consider the information and elect whether or not to answer the telephone call.

BACKGROUND

A call screening service, commonly known as "Caller I.D." has gained wide scale utilization amongst present-day telephone users. Caller I.D. is a service provided to the telephone user by the telephone service provider. Typically, the service provider supplies the user with information from the service provider's subscriber database. The information typically includes the telephone number of the telephone a caller is calling from and the subscriber name documented to that number. The data base information is delivered to the user concurrent to the user's telephone being rung and is provided on a display for the user to read. Subsequently, the user reviews the information provided and determines whether or not he desires to answer the call.

Present-day Caller I. D. exhibits two notable shortcomings. As the first shortcoming, very often the caller is someone other than the subscriber name documented to the calling telephone. Consequently, the user can never be certain who is actually calling. Conversely, a caller wishing to avoid screening need only place his call from some telephone other than one of which he is the documented subscriber, such as a pay telephone or someone else's telephone. As the second shortcoming, the user is subject to perpetually paying a monthly fee to the service provider in order to receive the Caller I.D. service.

U.S. Pat. Nos. 5,511,111 to Serbetcioglu, 5,651,053 to Mitchell, 5,712,902 5,796,806 to Birckbichler and 5,850,435 to Devillier and suggest ways and means to receive information from the actual caller and deliver that information to the user. This information when delivered thus provides the user with the true identity of the caller rather than merely the subscriber and number registered to the calling telephone. Accordingly, these references alleviate the above described first shortcoming of Caller I.D. However, as with Caller I.D., these references suggest their service be provided to the user by the telephone service provider. In other words, these services retain the above-described second shortcoming of Caller I.D., that is, the user perpetually paying a monthly fee to the service provider.

Common-day telephone "answering machines" alleviate the two described shortcomings of Caller I.D. Firstly, the call-screening feature of answering machines supplies the user with the actual voice of the actual caller, enabling the user to positively determine the true identity of the actual caller. Secondly, because answering machines reside as property of the user, no monthly fee need ever be paid to the telephone service provider.

Answering machines employ answering circuitry to answer a telephone call incoming from the service provider and to attain information from the caller. Answering machines include a delay, an information recorder and an information signal provider. The delay postpones the machine's answering of the call, allowing the user's telephone to first ring for a prescribed length of time. Thus the user is afforded the opportunity to answer the call if they so desire.

Upon answering a call, answering machines communicate a message to the caller, such as "Please leave a message". If the caller leaves a message, that message is received by the answering circuitry and forwarded to the information recorder where it is recorded. At the same time the message is also forwarded to the information signal provider. The signal provider then forwards what is a live audio signal to a loudspeaker. The live audio signal operates the loudspeaker and, so, the caller's message can be heard out of the loudspeaker as the caller leaves the message. Upon listening to the caller leave the message (screening the call), the user positively identifies the caller's voice and thus determines the caller's true identity. Accordingly, if the user decides he cares to talk with this particular caller, the answering machine provides that the user can answer the call by answering his telephone.

Unfortunately, caller identification via the message-screening feature of answering machines is accomplished as a by-product of recording a message from the caller. Consequently, the effectiveness is greatly compromised. For instance, with answering machine message screening, often times the caller simply chooses not to leave a message and, thus, the user is not afforded the opportunity to screen and potentially answer the call. As a further compromise, when the user decides to answer a call being screened, the answering constitutes an abrupt/rude cut-in to the caller's leaving of a message.

SUMMARY OF THE INVENTION

Embodiments of the present invention employ answering circuitry to attain information from a caller and an information signal provider to provide a signal to deliver the information to the called party (user).

As an example of the operation of one embodiment, upon answering a call the system communicates a message to the caller such as, "Whom can I say is calling?" The name of the caller is then attained from the caller by the answering circuitry and forwarded to the information signal provider. Subsequently a message such as, "Please hold" is played to the caller. The information signal provider then composes the attained name of the caller into an audio signal and sends the audio signal to a loudspeaker. For instance, the caller has given his name, "John Stolz", and that information when composed and sent to the loudspeaker will be broadcast from the loudspeaker as "John Stolz", followed by a two second pause, and again "John Stolz" followed by a two second pause, and again "John Stolz" and so on. By providing the information in this repeating fashion, the user is afforded ample time/opportunity to satisfactorily hear the information and make a positive identification of the caller's voice.

Upon establishing a positive identification, the user can then decide if he cares to talk with this particular caller, and if so, answers the call. If the user is not available or if the user decides not to answer the call, after a given length of time broadcasting the repeated caller's name, this embodiment of the invention then plays a message such as, "No one is presently available, please leave a message after the tone". Subsequently, this embodiment will record a message from the caller if the caller decides to leave one.

As with answering machines, embodiments of the present invention (such as the above described example) also alleviate the two described shortcomings of Caller I.D. Firstly, the user is enabled to hear the actual caller's voice and therefrom establish a positive identification of the actual caller. Secondly, the system resides as property of the user. Consequently, no monthly fee need ever be paid to the telephone service provider.

BRIEF DESCRIPTION OF THE DRAWINGS

A preferred form of the invention is illustrated in the accompanying drawings in which.

DETAILED DESCRIPTION OF THE PREFERRED EMBODIMENTS

The present invention presents a greatly improved means to deliver information about the caller to the user relative to answering machines. The invention functions by first identifying the caller and later can then additionally function to record a message from the caller. Because the functions of caller identification and message recording are performed independently, initially the caller need merely be requested to identify himself (rather than requested to leave a message). Akin to the request to identify himself, the caller inherently understands that a response is likely required for the call to go through. Therefore, the caller is greatly more compelled to supply a response than is the case with answering machines.

Further, because the functions of caller identification and message recording are performed independently, the present invention eliminates the previously discussed "abrupt/rude cut-in to the caller's leaving of a message" associated with answering machines. The present invention lends a smooth continuity whereby the caller provides the information requested and waits for the user to answer. If and when the user does answers, the conversation can then comfortably begin with the customary opening pleasantries:

The present invention pertains to telephone calls. Accordingly, a general description of telephone service is appropriate for this discussion. For decades, telephone service in the U.S. was provided by an entity commonly known as "the phone company", "Ma Bell" and "AT&T". Deregulation broke up the giant telephone service provider into a network of service providers now commonly referred to as "the baby bells". For this discussion, the present-day network of service providers including the circuitry they employ is referred to as a telephone service provider.

Figure 11:
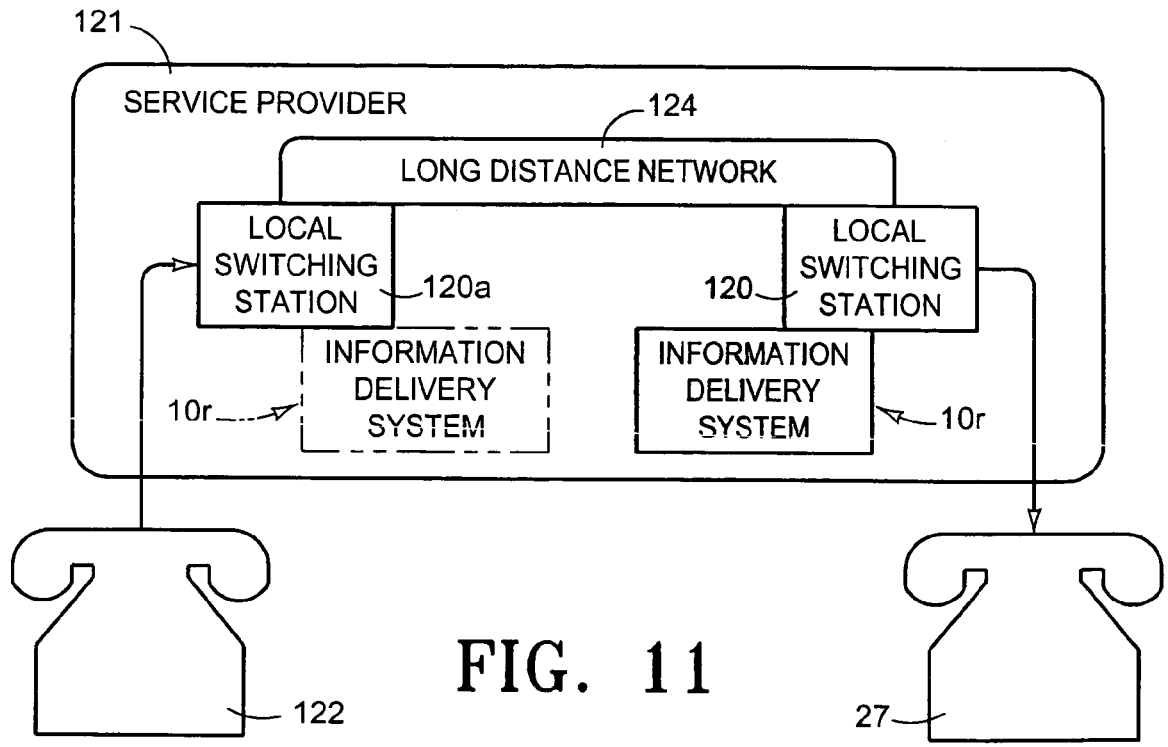
FIG. 11 is a block diagrammatic view depicting a telephone service provider with the present invention located therein.

One example of circuitry which can be employed by a service provider 121 in the routing of a telephone call is shown in FIG. 11. An example of operation of the circuitry example shown will now be given. The caller places a call from the caller's phone 122. That call is received at local switching station 120a, sent over long distance network 124 and received at local switching station 120. Station 120 then rings the user's telephone 27. If telephone 27 is answered, station 120 then communicably connects phone 122 with phone 27.

Examples of the present invention, referred to herein as telephone call information delivery system 10, are illustrated in the accompanying FIGS. 1a through 11. Information delivery system 10a through 10q can reside with and as the property of the telephone user as illustrated in FIGS. 1a through 9. Alternately, information delivery system 10r lends benefit to the user but resides with and as the property of telephone service provider 121 (shown in FIG. 11). Accordingly, the benefits of system 10r are then provided as a service to the user by provider 121. (Delivery system 10r comprises substantially different circuitry than the examples of system 10a through 10q shown in FIGS. 1a through 9.)

Figure 7:
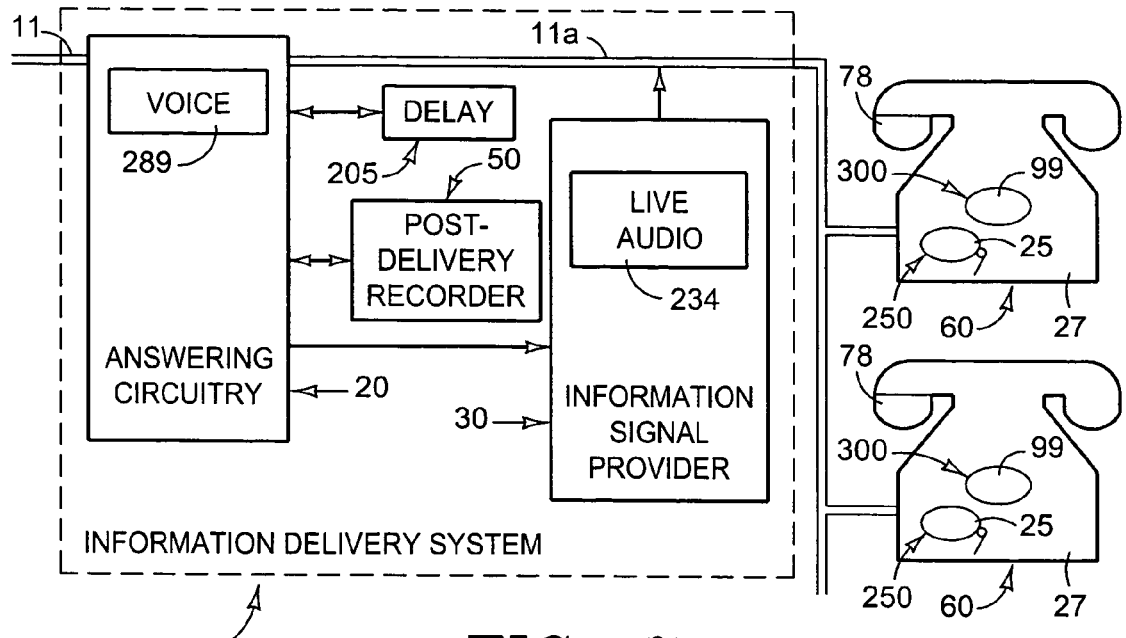
FIG. 7 is a block diagrammatic view depicting an example of a seventh preferred embodiment comprised of answering circuitry, an information signal provider, a delay and a post-delivery recorder.
Figure 8:
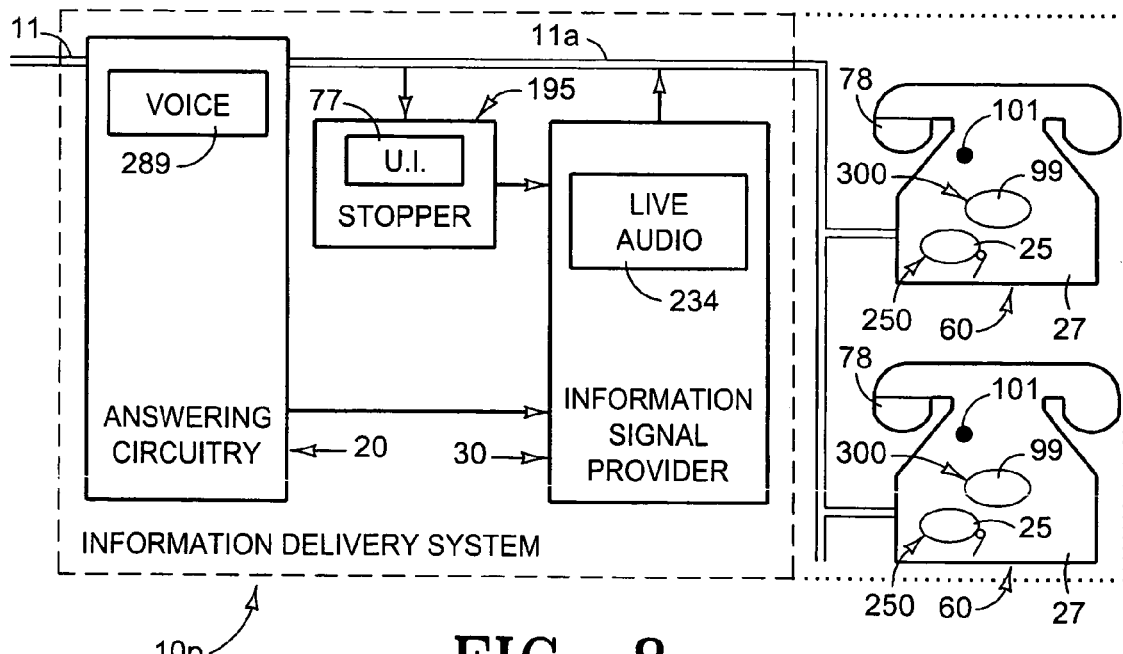
FIG. 8 is a block diagrammatic view depicting an example of an eighth preferred embodiment comprised of answering circuitry, an information signal provider, a delay and a stopper.
Figure 9:
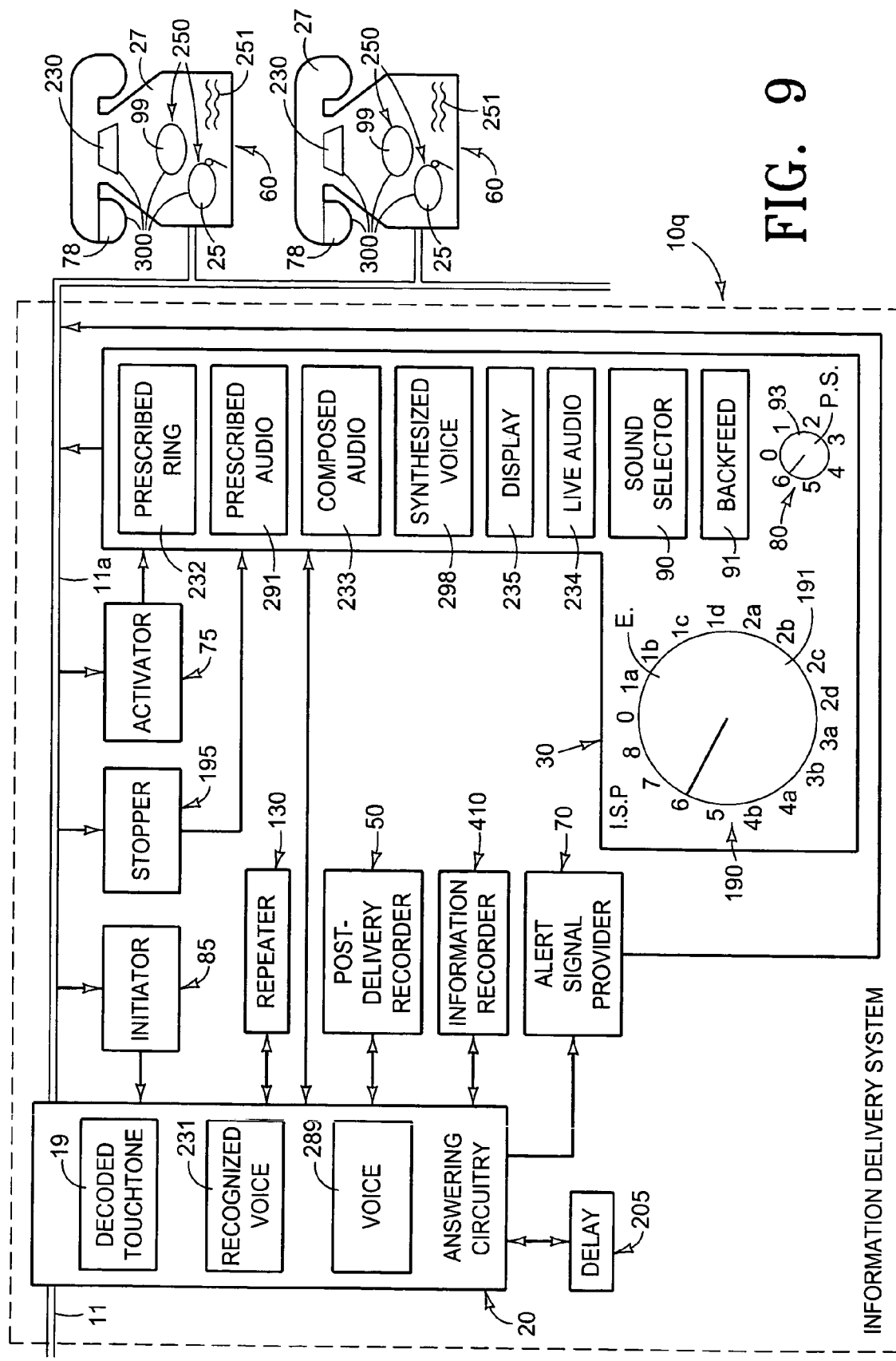
FIG. 9 is a block diagrammatic view depicting an example of a ninth preferred embodiment comprised of a plurality of information delivery systems and an enabler.

Information delivery system 10a through 10q as shown in FIGS. 1a through 9 employs an answering circuitry 20 and an information signal provider 30. Information delivery system 10 can also employ these components discussed later-on: a post-delivery recorder 50 (FIG. 1c), an alert signal provider 70 (FIG. 2a), an information recorder 410 (FIG. 2b), an activator 75 (FIG. 3a), an initiator 85 (FIG. 4a), a delay 120 (FIG. 5), a repeater 130 (FIG. 6), a stopper 195 (FIG. 8) and an enabler 190 (FIG. 9).

Answering circuitry 20 (FIGS. 1a through 10a) functions to answer a telephone call incoming from a telephone service provider 121 and to attain information input by the caller. Circuitry providing this same functionality is presently employed in common-day telephone call directing systems and also in common-day telephone answering systems. In other words, the circuitry and functionality of circuitry 20 is well known. (Circuitry like circuitry 20 functions in a telephone call directing system to answer a telephone call incoming from a telephone service provider and to attain information input by the caller. The information attained identifies to the system whom the caller desires to speak with. Accordingly, the system then connects the incoming line (caller) with a telephone line of a telephone used by the identified party. The system then rings that telephone. Circuitry like circuitry 20 functions likewise in an answering machine, that is, to answer a telephone call incoming from a service provider and to attain information input by the caller. The answering machine merely passes that information along live to a loudspeaker to be heard by the user for call screening purposes. At the same time the answering machine also records the information.)

Figure 10:
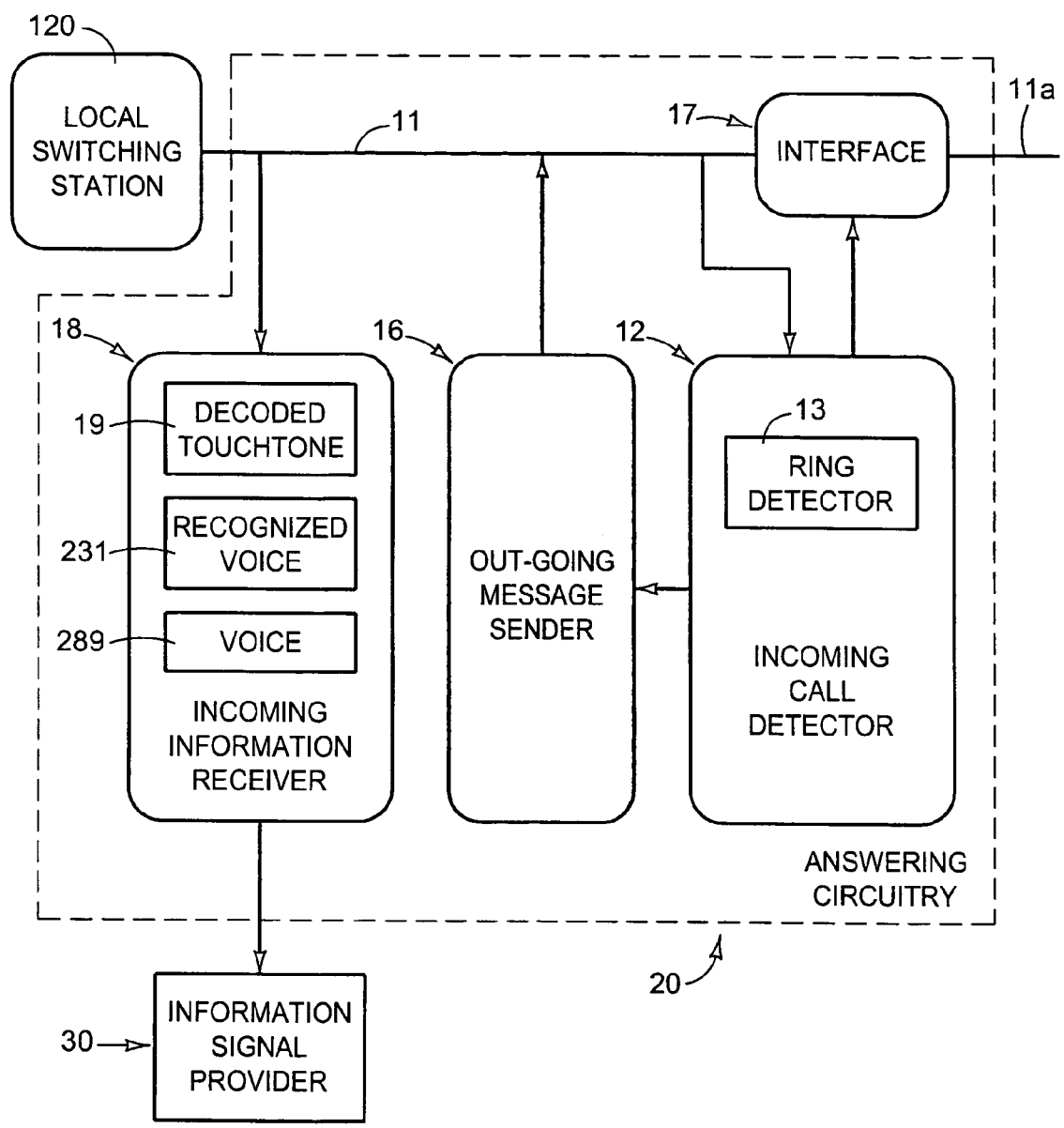
FIG. 10 is a block diagrammatic view depicting a first example of answering circuitry.

An example of answering circuitry 20 is shown in FIG. 10. The circuitry 20 shown provides the above-described functionality common to this invention, call directing systems and also answering machines. In the example of FIG. 10, circuitry 20 is shown functional interactive with the common-day incoming telephone call transmitted over a common-day telephone line 11 from a common-day switching station 120.

The answering circuitry 20 of FIG. 10 employs an incoming call detector 12, an interface 17, an out-going message sender 16 and an incoming information receiver 18. (Call detector 12 and interface 17 function in combination to answer a telephone call incoming from service provider 121. Receiver 18, by itself or in combination with out-going message sender 16, functions to attain information input by a caller.)

Incoming call detector 12 functions to detect a telephone call incoming from service provider 121. Detector 12 employs a ring detector circuit 13. Ring detector 13 is electrically connected to telephone line 11 and senses the presence of an incoming ring signal. The ring signal is of common fashion sent by switching station 120.

Interface 17 functions to control connection and release operations relative to line 11. Interface 17 is electrically connected to line 11 and, responsive to input, simulates a telephone off-hook condition. The simulated off-hook condition is detected by switching station 120 which responds by discontinuing the sending of the ring signal, by discontinuing a ring sound signal sent to the caller's telephone and by connecting the incoming call with telephone line 11. (As part of the functioning of circuitry 20, interface 17 can optionally be configured to connect and disconnect two-way communication between telephone 27 and an incoming call. The two-way communication pathway can be disconnected in the case where signals sent from system 10 to telephone 27 (via line 11a) and from telephone 27 to system 10 are desired not to travel back to the caller's telephone or the service provider.)

Out-going message sender 16 functions to elicit information from the caller. Sender 16 is electrically connected to telephone line 11 and sends a recorded message to line 11 and, thus, ultimately to the caller. (For many embodiments of delivery system 10, the recorded message can constitute a request to the caller to identify himself. It is not unfathomable that in future years, the popularity of information delivery system 10 could become so great that the described answering of the call and subsequent discontinuing of the sending of the ring sound to the caller will suffice for the caller to understand to identify himself. Therefore, the services of message sender 16 are not necessarily essential to circuitry 20 of FIG. 10.)

Incoming information receiver 18 functions to receive information and, in some cases, additionally functions to convert that information into a form understandable/usable to system 10. Receiver 18 is electrically connected to line 11 and receives signal information therefrom. Information received by receiver 18 (and converted to a usable form if necessary) is herein considered as attained information. Receiver 18 functions to attain information in the form of at least one of decoded touchtone information 19, recognized voice information 231 and voice information 289. (Receiver 18 can be configured so that the period of time delay is pre-programmed or configured so the period can be set by the user.)

Decoded touchtone information 19 originates from the caller depressing one or more touchtone keys on the touchtone telephone he is calling from. A coded signal generated by each depressed key is received from line 11 by receiver 18. Receiver 18 then functions to decode the signal in order that the system will know what touchtone key(s) was in fact depressed by the caller. (While receiver 18 functions to attain information in the form of, for example, decoded touchtone information 19, the essence of the information attained is, for example, that the caller wishes to speak with the user represented by the key depressed. Touchtone decoding is commonplace technology. For example, one embodiment of the prior described commonplace telephone call directing system can ask the caller, "To speak with John Jeffers push one, to speak with Paul Bunyon push two" and so on. The system then receives and decodes the associated coded signals. The decoded touchtone information then serves to instruct the system as to which telephone to connect to and ring in order to reach the desired user.)

Recognized voice information 231 originates with the caller speaking into the microphone of the telephone he is calling from. Audio signals representing the speaking are generated and subsequently received from line 11 by receiver 18. Receiver 18 then functions to employ voice recognition so that the system can then understand/use the information. (Voice recognition, particularly mere recognition of the numbers zero through nine is commonplace technology. For example, an embodiment of the prior described commonplace telephone call directing system can ask the caller, "To speak with John Jeffers say one, to speak with Paul Bunyon say two" and so on. The system then receives the audio signals generated when whatever number is spoken by the caller and proceeds to recognize what number was in fact spoken. The recognized voice number serves to instruct the system as to which telephone to connect to and ring in order to reach the desired user.)

Voice information 289 originates with the caller speaking into the microphone of the telephone he is calling from. Audio signals representing the speaking are generated and subsequently received from line 11 by receiver 18. Receiver 18 then forwards the audio signals for eventual delivery in some form to the user by system 10. (Receiving and forwarding voice information is commonplace technology. For example, an embodiment of the prior described telephone answering machine can ask the caller, "Please leave a message". The machine then receives the audio signals generated by the speaking of the caller and forwards them along to a loudspeaker so that the speaking can be heard by the user. Also, circuitry 20 can be configured to monitor recognized voice information 231 and voice information 289 when received. If no information is left or the left information is unclear, circuitry 20 can, for example, again elicit information from the caller, or other.)

An example of operation of the example of circuitry 20 shown in FIG. 10 will now be given. Operation begins when the ring signal of an incoming call is detected by ring detector 13. Call detector 12 responds by signaling interface 17. Interface 17 responds by simulating an off-hook condition. Consequently, answering circuitry 20 has accomplished, "Answering a telephone call incoming from a telephone service provider".

Further in response to the detected ring signal, call detector 12 signals message sender 16. Sender 16 responds by sending a recorded message to the caller such as, "To reach Graydon press one, to reach Mathew press two, to reach Adam press three, to reach Bertha press four". The caller responds to the message by depressing the touchtone key associated with the party he desires to speak with. The resulting coded touchtone signal is received by information receiver 18 and decoded. The resulting attained information in the form of decoded touchtone information 19 is forwarded to information signal provider 30 (provider 30 shown in FIGS. 1*a* through 10*a*). Consequently, answering circuitry 20 has accomplished, "attaining information input by the caller".

The example of circuitry 20 in FIG. 10 also functions to reset the system in anticipation of answering the next incoming call. (Telephone call directing systems and telephone answering machines are devised to be able to accommodate the next incoming call, i.e. system reset is well known.) An example of system reset will now be given. Circuitry 20 resets the system upon detecting an answering of the incoming call by the user. The answering is detected by interface 17 detecting the off-hook condition resultant from the answering at telephone 27 (telephone 27 shown in FIGS. 1*a* through 9). Upon detecting the off-hook condition, interface 17 discontinues the simulating of an off-hook condition. (Depending upon the embodiment of system 10, interface 17 can additionally respond by signaling provider 30 which discontinues sending signals to information deliverer 300, by signaling provider 70 which discontinues sending signals to alert 250, or other. Alternately, when telephone 27 is taken off-hook, phone 27 is devised to disconnect deliverer 300 and alert 250.) As another example of resetting system 10, circuitry 20 resets the system in the same fashion except this time in response to a hang-up of the caller's telephone.

Figure 10A:
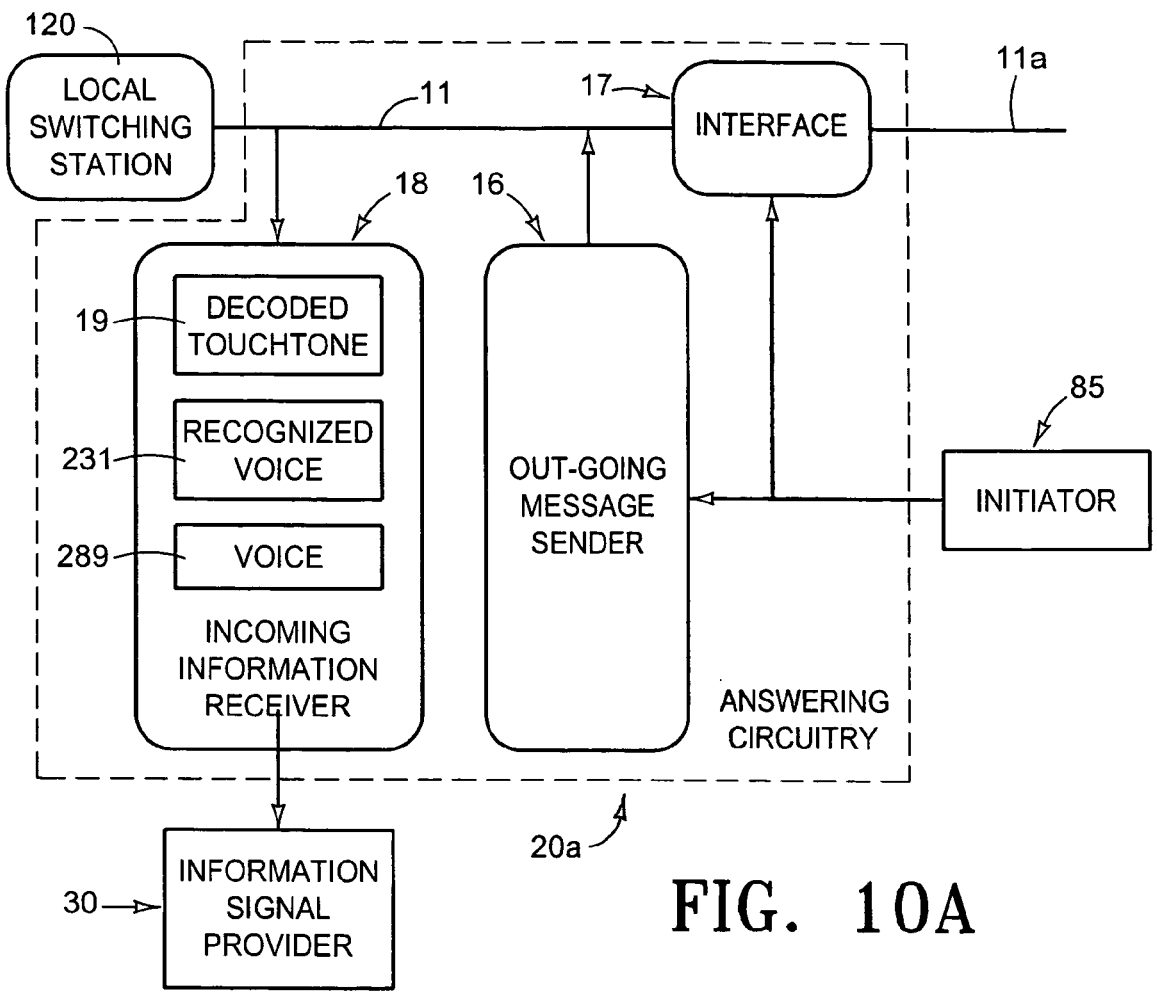
FIG. 10a is a block diagrammatic view depicting a second example of answering circuitry.

A second example of answering circuitry is shown as answering circuitry 20*a* in FIG. 10*a*. Like circuitry 20, circuitry 20*a* also functions to answer a telephone call incoming from service provider 121 and to attain information input by a caller. However, circuitry 20*a* performs the described functions absent employment of the incoming call detector 12 of circuitry 20. In other words, circuitry 20 is operable responsive to a telephone call incoming from service provider 121, while circuitry 20*a* is not. Instead, circuitry 20*a* is operable responsive to an initiator 85. Initiator 85 receives instruction from the user. Upon receiving such instruction, initiator 85 signals circuitry 20*a*. In response, circuitry 20*a* then operates in a manner identical to that described for circuitry 20 after circuitry 20 has detected an incoming call. (The functionality of circuitry 20*a* is further discussed later-on during the discussion of the embodiments of system 10 shown in FIGS. 4*a* and 4*b*.)

Information delivery system 10 includes information signal provider 30 (FIGS. 1*a* through 10*a*). Provider 30 functions to provide at least one signal to operate an information deliverer 300 to deliver at least some of the information attained by answering circuitry 20 to a user. Signal provider 30 is forwarded from circuitry 20 one or more of the described forms of attained information: decoded touchtone information 19, recognized voice information 231 or voice information 289. In response, provider 30 provides a signal representative of at least some of the attained information. Information signal provider 30 can be configured to provide any of: a prescribed ring signal 232 (FIG. 1*a*), a prescribed audio signal 291 (FIG. 1*b*), a composed audio signal 233 (FIG. 1*d*), a display signal 235 (FIG. 2*c*) or a live audio signal 234 (FIG. 2*d*). (Signal provider 30 can be comprised of common-day electrical components such as a microprocessor and memory available to the microprocessor, or other.)

An example of prescribed ring signal 232 (FIG. 1*a*) will now be given. Ring signal 232 is configured as a pulse sequence, signal 232 being stored by provider 30. In this example, provider 30 has six such ring signals 232 stored, each one unique from the others. Each unique ring signal 232 is then provided by provider 30 in response to attained information from circuitry 20 indicating that a particular one of six touchtone keys has been depressed by a caller. An example of system operation employing the example of ring signal 232 will be given later-on during the discussion of the embodiment of FIG. 1*a*.

An example of prescribed audio signal 291 (FIG. 1*b*) will now be given. Signal 291 is an audio signal stored by provider 30. In this example, provider 30 has six such audio signals stored, each one unique from the others. Each unique signal 291 is then provided by provider 30 in response to attained information from circuitry 20 indicating that a particular one of six touchtone keys has been depressed by a caller. An example of operation employing the example of prescribed audio signal 291 will be given later-on during the discussion of the embodiment of FIG. 1*b*.

An example of composed audio signal 233 (FIG. 1*d*) will now be given. Signal 233 is composed by provider 30 employing voice information 289 attained by and forwarded from answering circuitry 20. For this example, the voice information 289 represents the name of the caller, for this example "Graydon Johnson". The resultant signal 233 sent from provider 30, when operating a loudspeaker 99, produces the sound "Graydon Johnson", followed by a pause, the sound "Graydon Johnson", followed by a pause, and so on. The pause can be, for example, one second in duration. (Signal information which generates sound when operating loudspeaker 99 can be composed in with information 289 in place of the pause, i.e. door bell sound, cow moo sound, ring sound or other. Loudspeaker 99 constitutes one form of information deliverer 300. System 10 can include a volume control 211, FIG. 2*b*, configured to enable a user to adjust the volume of audio information delivered. System 10 can also include circuitry to homogenize the volume of audio information delivered to compensate for varying loudness of voice from the caller.)

As another example of composed audio signal 233 (FIG. 2*a*), signal 233 is configured by provider 30 employing voice information 289 received and forwarded by answering circuitry 20. The voice information 289 is stored by provider 30 for a specified length of time. After the specified length of time elapses, provider 30 sends the voice information 289, now described herein as composed audio signal 233, to a telephone receiver 78. For instance, provider 30 can be forwarded from circuitry 20 voice information 289 representative of "Graydon Johnson". After the storage period elapses, the composed audio signal 233 representative of "Graydon Johnson" is sent to telephone receiver 78 and operates receiver 78 to produce the sound "Graydon Johnson". (Telephone receiver 78 constitutes one form of an information deliverer 300. Receiver 78 can also comprise a speaker with the same broadcasting characteristics of receiver 78 but does not also function as a telephone receiver.)

An example of display signal 235 (FIG. 2*c*) will now be given. Decoded touchtone information 19 (or recognized voice information 231) is attained by circuitry 20 and forwarded to provider 30. Information 19 instructs provider 30 to release a stored display signal 235, the signal 235 being representative of the person desired by the caller. Signal 235 is sent to display 230. Signal 235 causes the name of the person desired by the caller to be written on display 230. (Display 235 constitutes one form of information deliverer.)

As another example of display signal 235, voice information 289 is attained by circuitry 20 and forwarded to provider 30. Provider 30 then employs voice recognition to convert information 289 into display signal 235. Display signal 235 is then sent to display 230. If the voice information 289 represents "Graydon Johnson", signal 235 will cause "Graydon Johnson" to be written on display 230.

An example of live audio signal 234 (FIG. 2c) will now be given. Voice information 289 is attained by circuitry 20 and forwarded to provider 30. Provider 30 then forwards that signal, now herein described as live audio signal 234, to operate loudspeaker 99. In other words, the voice information 289 is delivered "live" to the user.

Figure 1D:
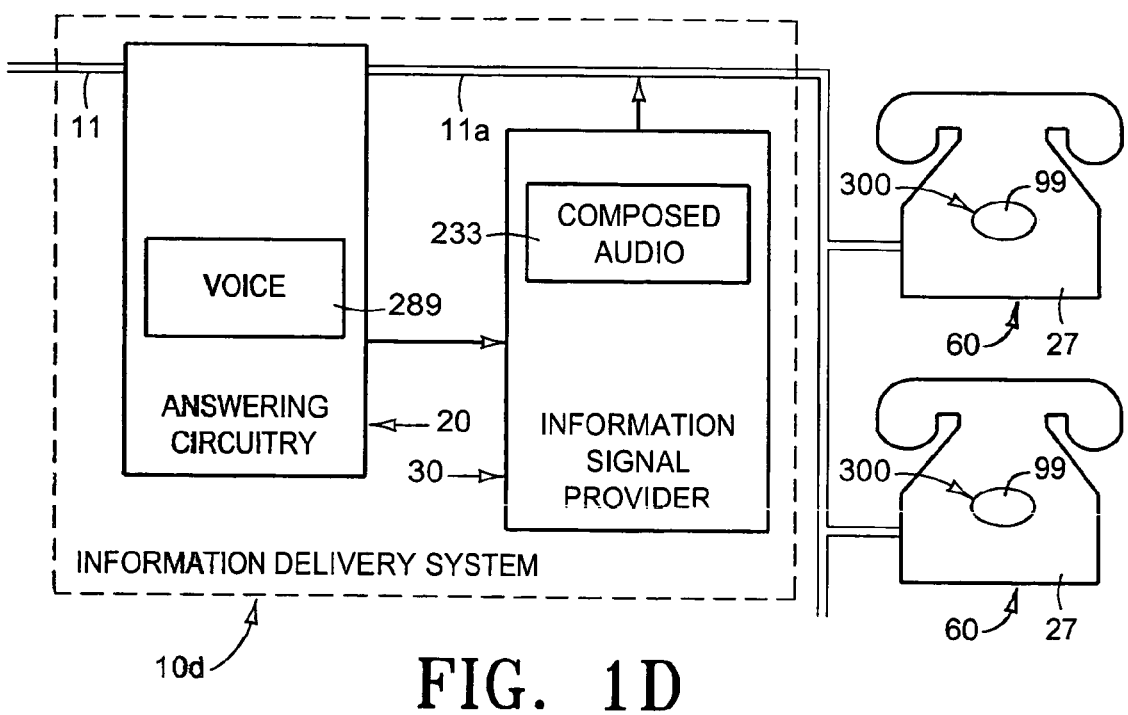
Figure 2A:
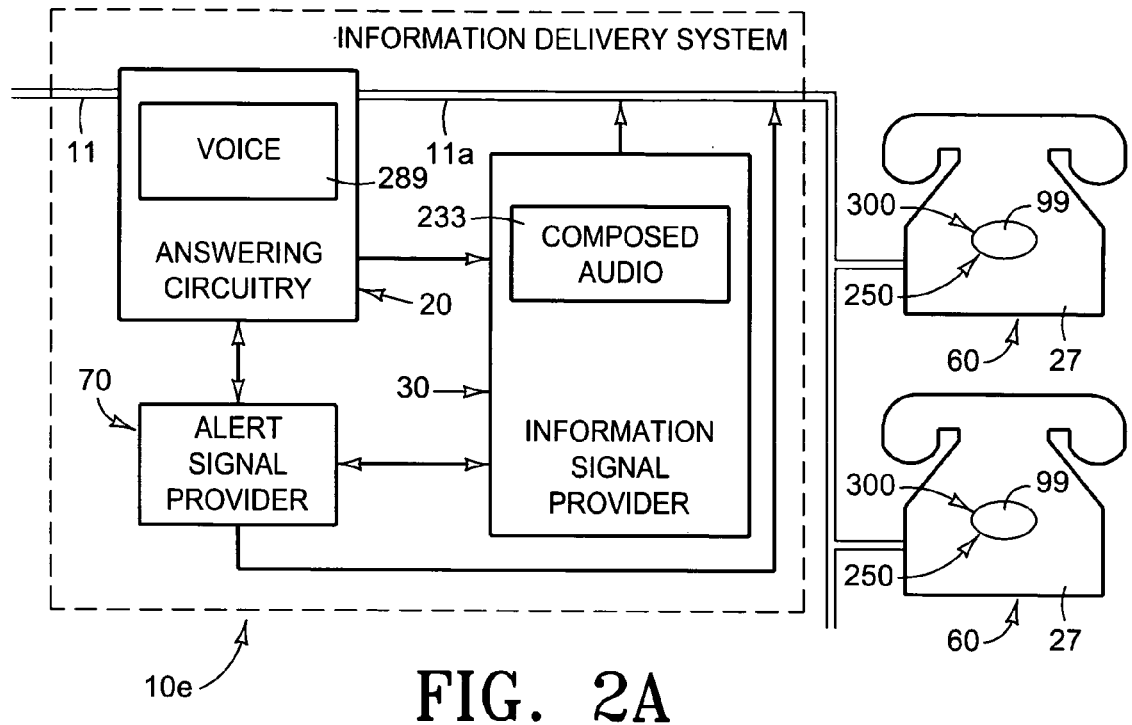
FIGS. 2a, 2a, 2c and 2d are block diagrammatic views depicting examples of a second preferred embodiment comprised of answering circuitry, an information signal provider and an alert signal provider.
Figure 2B:
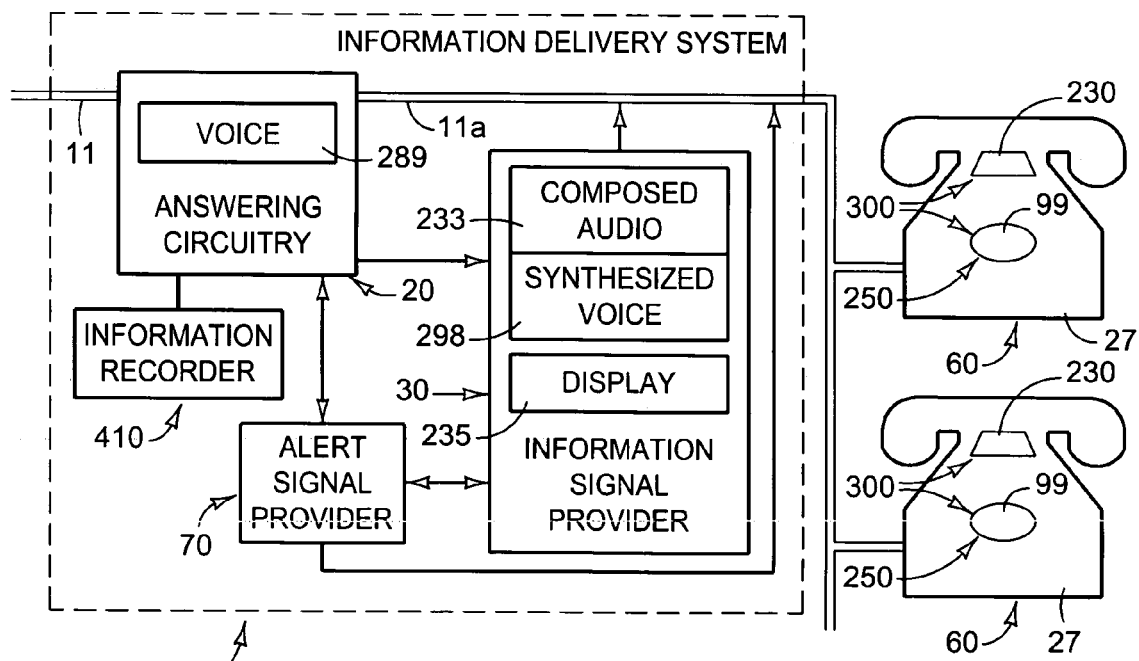

Additionally, provider 30 can provide synthesized voice 298 (FIG. 2b). As an example, voice information 289 is forwarded to provider 30 from circuitry 20. Provider 30 then employs voice recognition to convert information 289 into synthesized voice information 298. The synthesized voice 298 is employed by provider 30 in the place of voice information 289 in the composing of composed audio signal 233. In any embodiment of system 10 where composed audio signal 233 is employed, provider 30 can employ synthesized voice 298 in place of voice information 289 when composing signal 233 (FIGS. 1d, 2a, 3a, 4a, 5 and 9).

A first preferred embodiment of information delivery system 10 is shown in FIGS. 1a, 1b, 1c and 1d. This first preferred embodiment employs answering circuitry 20 (FIG. 10) to answer a telephone call incoming from telephone service provider 121 and to attain information input by a caller. This embodiment also employs information signal provider 30 to provide at least one signal to operate an information deliverer 300 to deliver at least some of the information attained by circuitry 20 to a user. (This first preferred embodiment can additionally employ post-delivery recorder 50, FIG. 1c; alert signal provider 70, FIG. 2a; information recorder, FIG. 2b; activator 75, FIG. 3a; initiator 85, FIG. 4a; delay 205, FIG. 5; stopper 195, FIG. 8; and enabler 195, FIG. 9.)

Figure 1A:
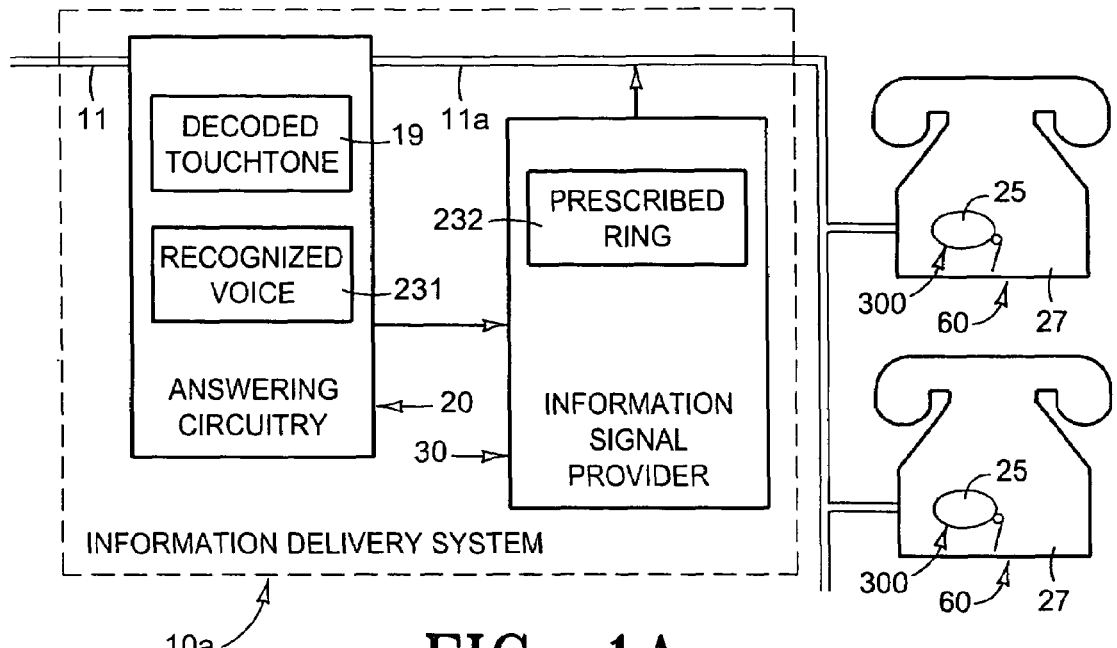
FIGS. 1a, 1b, 1c and 1d are block diagrammatic views depicting examples of a first preferred embodiment comprised of answering circuitry and an information signal provider.

A first example of this first preferred embodiment is illustrated as system 10a in FIG. 1a. As shown, circuitry 20 of this example is configured to attain one or both of decoded touchtone information 19 or recognized voice information 231. (Alternately, circuitry 20 can be configured to attain only information 19 or only information 231.) As shown, provider 30 of this example is configured to provide prescribed ring signal 232.

An example of system operation of this first example of this first preferred embodiment will now be given. Operation begins when an incoming call is detected by answering circuitry 20. Circuitry 20 answers the call and a message such as, "Welcome to the Johnson's, to reach Mathew press or say one, to reach Adam press or say two, to reach Graydon press or say three, to reach Bertha press or say four" is sent by circuitry 20 to the caller. The caller responds by, for example, depressing the key numbered "4" on the touchtone keypad of the telephone he is calling from. Depressing key "4" generates a coded signal representing that key which is sent to and received by circuitry 20. Upon receiving the coded signal, circuitry 20 decodes the signal and, consequently, has attained information in the form of decoded touchtone information 19. Information 19 is then sent to information signal provider 30.

The decoded touchtone information 19 instructs provider 30 that the caller has depressed touchtone key "4". In response, provider 30 provides a prescribed ring signal 232 associated with key "4". Ring signal 232 is sent to and, in this example, operates ringer 25 which emits a telephone ring having a ring cadence identifiable by the system users as representative of choice "4". The system users thus understand that the caller desires to speak with Bertha. Users who aren't Bertha likely choose not to be bothered answering the call and not to intrude into Bertha's private affairs. If the user is Bertha, she understands the call is for her and can answer. Upon a user answering telephone 27 or the caller hanging up, circuitry 20 resets the system.

Figure 1B:
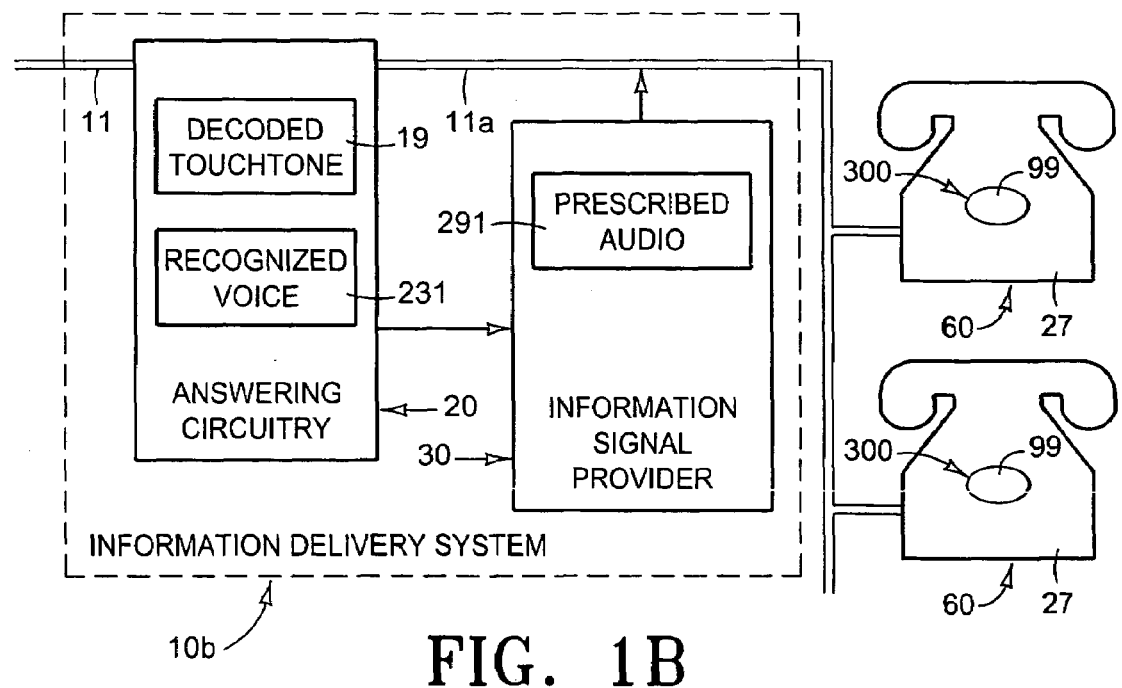

A second example of this first preferred embodiment is shown as system 10b in FIG. 1b. As shown, circuitry 20 of this example is configured to attain one or both of decoded touchtone information 19 or recognized voice information 231. (Alternately, circuitry 20 can be configured to attain only information 19 or only information 231.) As shown, provider 30 of this example is configured to provide prescribed audio signal 291.

An example of system operation of this second example of this first preferred embodiment will now be described. Operation begins when an incoming call is detected by answering circuitry 20. Circuitry 20 answers the call and sends a message such as, "Welcome to the Johnson's, to reach Mathew press or say one, to reach Adam press or say two, to reach Graydon press or say three, to reach Bertha press or say four" is sent by circuitry 20 to the caller. The caller responds by, for example, saying "1" into the microphone of the telephone he is calling from. Saying "1" into the microphone generates an audio signal which is sent to and received by circuitry 20. Upon receiving the signal, circuitry 20 employs voice recognition to achieve attained information in the form of recognized voice information 231. Information 231 is then sent to information signal provider 30.

The recognized voice information 231 instructs provider 30 that the caller has said "1". Provider 30 responds to the instruction by providing a prescribed audio signal 291 associated with "1". Audio signal 291 is sent to and operates loudspeaker 99 and, for this example, the sound "Mathew" is broadcast from loudspeaker 99. System users upon hearing "Mathew" understand that the caller desires to speak with Mathew. Users who aren't Mathew need not bother answering. Mathew understands the call is for him and can answer. Upon a user answering telephone 27 or the caller hanging up, circuitry 20 resets the system.

Figure 1C:
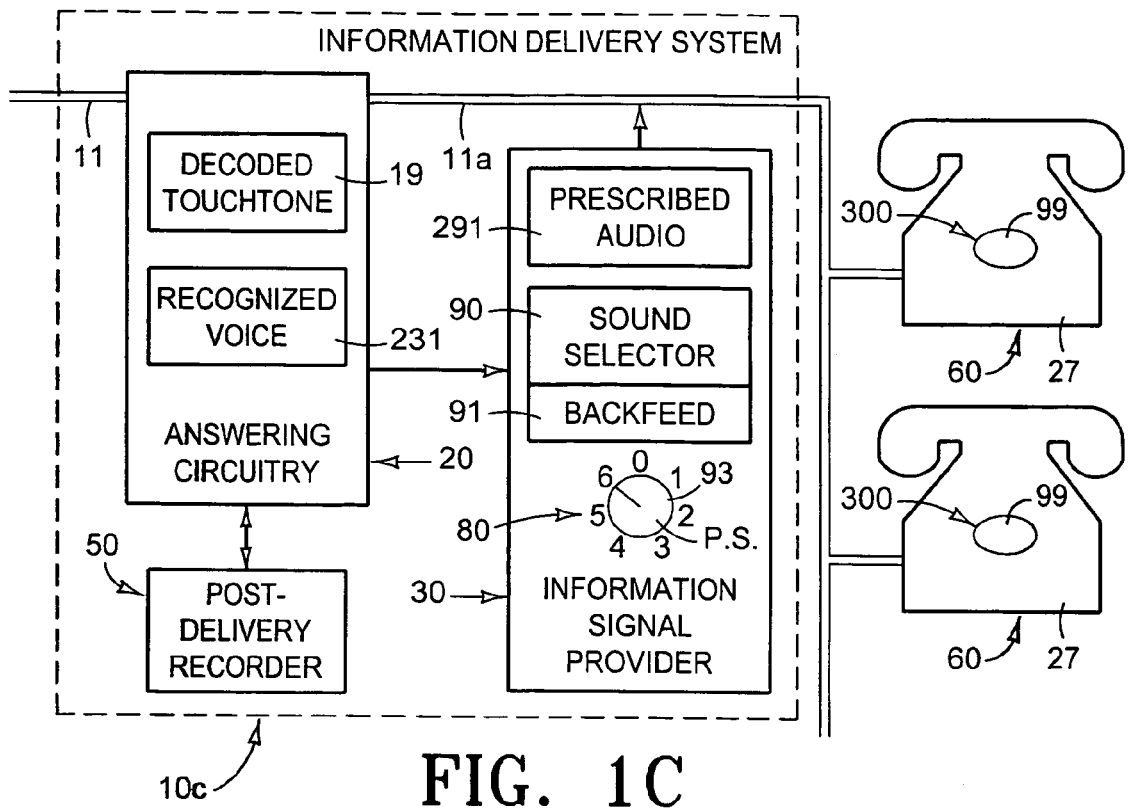

FIG. 1c illustrates a variation of the second example of this first preferred embodiment (FIG. 1b). Shown as delivery system 10c, the embodiment of the second example is configured with additional components which serve to enhance the embodiment, including: a post-delivery recorder 50, a sound selector 90 and a party selector 80. (These components can likewise be employed to enhance other embodiments and examples of the present invention.)

Post-delivery recorder 50 functions to record a post-delivery message from a caller. The recorded information can then be played back to the user. Post-delivery recorder 50 can employ separate message boxes 299. Boxes 299 function to store a message or messages specific to each user separate from messages specific to the other users. Each of boxes 299 can include means to send a personalized message to the caller, the message typically to request the caller to leave a message for that specific user. (Post-delivery recorder 50 can comprise hardware like that employed by common-day answering machines to record a message from a caller. However, answering machines function to record what is described herein as voice information 289. Post-delivery recorder 50 records information input by a caller subsequent to previous input by the caller of attained information such as voice information 289. Boxes 299 also can comprise hardware like that employed by common-day answering machines. Also, recorder 50 can be configured to provide for listening to the caller by the user while the caller leaves his message.)

An example of operation of the second example of this first preferred embodiment, when enhanced with post-delivery recorder 50, will now be given. In this example, provider 30 has received attained information from receiver 20 indicating that the caller wishes to speak with the user represented by number "1". In response, provider 30 has provided a prescribed audio signal 291 provider 30 associates with "1". Audio signal 291 has been sent to and has operated loudspeaker 99 which emitted the sound "Mathew". Subsequently, no one has answered the call within a specified amount of time. Consequently, as part of post-delivery recorder 50, the caller is sent a personalized message associated with a message box of message boxes 299 configured to receive messages for user "1". The message states, for example, "I can't find Mathew, please leave him a message." The caller can then leave a message for Mathew which will be recorded by recorder 50 (and stored in box number "1", for example, of message boxes 299). (If recorder 50 does not include boxes 299, the message from the caller can be simply stored in a compartment common to all users. If system 10 does not include recorder 50, system 10 can instead be configured to send the caller a message such as "Nobody's home" after the described specified amount of time. Also, the specified amount of time can be pre-programmed into the system or can be set by the user.)

As another example of operation of recorder 50, the initial message sent from answering circuitry 20 can state, "Welcome to the Johnson's, to reach Mathew press or say one, to reach Adam press or say two, to reach Graydon press or say three, to reach Bertha press or say four. If the person you desire does not answer, feel free to leave them a message after the beep." When no one answers the call within a specified time, a beep sound is sent to the caller and the caller can then leave a message. Because the caller has already indicated he desires to speak with, for example, user "1", the message is accordingly and preferably stored in box number 1. (If recorder 50 does not include boxes 299, the message from the caller can be stored in a compartment common to all users.)

Sound selector 90 functions to enable the user to select a sound to represent himself. Selector 90 can comprise a microprocessor with available storage, or other similar devices. (Selector 90, shown as being located at provider 30, can be located elsewhere to equal effect.)

An example of the operation of selector 90 will now be given. A multitude of prescribed audio signals 291 (or prescribed ring signals 232 when selector 90 is employed with the embodiment of FIG. 1*a*) have been stored in selector 90. Each of the stored signals 291 will, upon operating loudspeaker 99, generate a sound distinguishable from the other sounds generated from the other signals stored. Selector 90 is configured to enable a user to scroll through the possible sounds available and choose a sound to represent himself. Upon the user choosing a sound, provider 30 will then provide a prescribed audio signal 291 which when operating loudspeaker 99 will generate that sound. In other words, for example, when information attained from the caller indicates that the caller wishes to speak with Mathew, and Mathew has chosen from selector 90 the repeating sound of a steam whistle, for example, to represent himself, then provider 30 will provide in a repeating fashion the signal 291 representative of the steam whistle. That signal is sent to loudspeaker 99. Consequently, a repeating steam whistle sound is broadcast out of loudspeaker 99.

Selector 90 can include a backfeed 91. Backfeed 91 functions to provide a signal to deliver a sound to the caller. For example, the signal sent can be representative of the sound chosen by the user. In other words, if a repeating pig squeel is being broadcast from speaker 99 to alert the user, the caller will also hear the repeating pig squeel out of his telephone receiver.

Party selector 80 functions to govern at least one signal provided by provider 30 or to govern the providing of a signal by provider 30. The example of party selector 80 shown includes a selector switch 93. Switch 93 can be a rotary switch with numbered positions. (Selector 80, shown located at provider 30, can be located elsewhere to equal effect, including, for example, at communication device 60.)

An example of operation of the example of party selector 80 shown will now be given. In this example, a user is remote from other users and only wishes to be disturbed by calls specifically directed (by the caller) to him. The user turns selector switch 93 so that the pointer points to the system number which designates him (for example, to reach Mathew press "1", wherein one is the system number representing Mathew). Selector switch 93 allows the prescribed audio signal 291 (or prescribed ring signal 232 if employed by the embodiment of FIG. 1*a*) associated with that system number to pass from provider 30 through switch 93 to loudspeaker 99. Consequently, only the signal representative of a call directed to him will be allowed through switch 93 to then broadcast the sound representing him out of loudspeaker 99. If switch 93 points to all, all signals are allowed to pass through. If switch 93 points to zero, no signals are allowed to pass through.

A third example of this first preferred embodiment is shown as delivery system 10*d* in FIG. 1*d*. As shown, circuitry 20 of this example has been configured to attain voice information 289. As shown, provider 30 of this example is configured to provide composed audio signal 233.

An example of system operation of this third example of this first preferred embodiment will now be given. Operation begins when an incoming call is detected by answering circuitry 20. Circuitry 20 answers the call and the message, "Whom can I say is calling" (for example) is sent by circuitry 20 to the caller. The caller may respond by saying "Rob Thomas" into the microphone of the telephone he is calling from. Saying "Rob Thomas" into the microphone generates an audio signal which is sent to and attained by circuitry 20 in the form of voice information 289. Information 289 is then sent to signal provider 30.

Provider 30 employs the information 289 in the composing of a signal that repeats itself. The result is a composed audio signal 233 which when operating loudspeaker 99 produces, in this example, the sound "Rob Thomas", followed by a pause, "Rob Thomas" followed by a pause, and so on. The pause can be three seconds in duration, for example. The user can contemplate whether he desires to speak with Rob and answer the call or not. (Upon a user answering telephone 27 or the caller hanging up, circuitry 20 resets the system.)

This third example of the first preferred embodiment can also be enhanced with the addition of post-delivery recorder 50 (FIG. 1*c*). As an example of operation, if the user does not answer within a specified time, the caller is sent a message such as, "Please leave a message." The message can then be recorded by recorder 50. (Recorder 50 can alternately include separate message boxes 299. Accordingly, as part of the caller being asked to leave a message, the caller can also be asked to indicate whom they desire to leave the message for and the message can then be stored in a separate message box 299 specific to that desired person. Also, delivery system 10 can be configured such that two embodiments can be operational simultaneously. For example, systems 10*a* and 10*d* can be operated simultaneously providing the combined benefits of both systems.)

In summary, the examples of the first preferred embodiment of delivery system 10 (FIGS. 1*a* through 1*d*) operate by: Step(1) Answering a telephone call incoming from a service provider; Step(2) Attaining information input by a caller (attaining information in the form of at least one of: decoded touchtone information 19, recognized voice information 231 or voice information 289); Step(3) Providing at least one signal to operate an information deliverer to deliver at least some of the attained information to a user (providing at least one of: prescribed ring signal 232, prescribed audio signal 291 or composed audio signal 233).

As previously suggested, system 10 can alternately be configured to reside at service provider 121 (an example is shown as system 10*r* in FIG. 11). When configured to reside at provider 121, the first preferred embodiment operates differently than the examples of FIGS. 1*a* through 1*d*. While the systems of FIGS. 10*a* through 10*d* operate by answering a telephone call incoming from service provider 121, the first preferred embodiment when located at provider 121 operates by intercepting a telephone call when en route through service provider 121. Accordingly, the first preferred embodiment when configured to reside at provider 121 can operate as previously described with the exception that Step(1) instead constitutes: Intercepting a call when en route through a service provider.

A second preferred embodiment of information delivery system 10 is illustrated in FIGS. 2*a*, 2*b*, 2*c* and 2*d*. This second preferred embodiment employs answering circuitry 20 and information signal provider 30. Additionally, this embodiment employs alert signal provider 70. (This second preferred embodiment can additionally employ post-delivery recorder 50, FIG. 1*c*; activator 75, FIG. 3*a*; initiator 85, FIG. 4*a*; delay 205, FIG. 5; repeater 130, FIG. 6; stopper 195, FIG. 8; and enabler 195, FIG. 9.)

Alert signal provider 70 functions to provide at least one signal to operate an alert 250 to alert a user of the system regarding a telephone call. As shown (FIGS. 2*a* through 2*d*), provider 70 is preferably electrically connected to line 11*a* and is configured to send a signal via line 11*a* to reach and operate alert 250. Alert 250, shown located on telephone 27 as loudspeaker 99, can alternately comprise ringer 25, a vibrator alert 251 (common to cellular phones), a light, or other similar devices. The signal from provider 70 can operate alert 250 in a repeating fashion such as the common-day ring cadence exhibited by common-day telephones, can operate alert 250 in a constant fashion, can simply activate alert 250, or other.

A first example of this second preferred embodiment is shown as system 10*e* in FIG. 2*a*. As shown, circuitry 20 of this example is configured to attain voice information 289. As shown, provider 30 of this example is configured to provide composed audio signal 233.

A first example of system operation of this first example of this second preferred embodiment will now be given. Operation begins when an incoming call is detected and, subsequently, answered by answering circuitry 20. The message, "This is Suzy, who's calling?", for example, is sent by circuitry 20 to the caller. The caller responds by speaking his name ("John Doggit", for example) into the microphone of the telephone he is calling from. The caller's response is attained by circuitry 20 in the form of voice information 289. Circuitry 20 forwards the attained information 289 to signal provider 30.

Upon receipt, provider 30 employs the information 289 in the composing of composed audio signal 233. Composed audio signal 233 is then sent to operate loudspeaker 99. (Signal 233 can additionally or alternately be sent to operate telephone receiver 78 FIG. 4*a*.)

Coinciding with provider 30 sending the exemplary signal 233 representative of "John Doggit", provider 30 signals alert signal provider 70. Signal provider 70 responds by providing a signal which operates alert 250 (for this example loudspeaker 99) to broadcast an alert sound. The signal from provider 70 is coordinated with the exemplary "John Doggit" signal information sent by provider 30 such that the combined result when broadcast from speaker 99 is "John Doggit" (from provider 30) followed by a pause, a ring cadence (from provider 70), followed by a pause, "John Doggit" followed by the pause, the ring cadence, and so on. For example, the pause can be one second in duration, and the ring cadence can be two seconds in duration (Upon a user answering telephone 27 or caller hang-up, system 10 resets.)

A second example of operation of this first example of this second preferred embodiment will now be given. Operation begins when an incoming call is detected and answered by answering circuitry 20. The message, "This is Suzy, whom can I say is calling?", for example, is sent by circuitry 20 to the caller. The caller responds by speaking his name ("Al Heck", for example) into the microphone of the telephone he is calling from. The caller's response is attained in the form of voice information 289 by circuitry 20. Subsequently, circuitry 20 forwards information 289 to information signal provider 30. Upon receipt, provider 30 stores information 289 as composed audio signal 233.

Upon forwarding information 289, circuitry 20 also signals alert signal provider 70. Provider 70 responds by providing an alert signal which operates alert 250 (for this example loudspeaker 99) to broadcast an alert sound. The time period the signal is being sent by provider 70 is measured and after a prescribed length of time, say fifteen seconds, provider 70 discontinues providing the alert signal and signals provider 30. Provider 30 responds by sending the composed audio signal 233 to operate loudspeaker 99. Consequently, (subsequent to the prescribed length of time of alerting) loudspeaker 99 broadcasts, "Al Heck" (for example) followed by a pause, "Al Heck" followed by a pause, and so on. The pause can be, for example, two seconds in duration. (Signal 233 can additionally or alternately operate telephone receiver 78. Upon a user answering telephone 27 or the caller hanging up, circuitry 20 resets the system.)

Shown as system 10*f*, FIG. 2*b* illustrates the first example of this second preferred embodiment (FIG. 2*a*) enhanced by the addition of an information recorder 410. Recorder 410 functions to record voice information 289. The recorded information can then be played back to the user at the user's convenience. Any of the embodiments of system 10 which attain voice information 289 (FIGS. 1*d* and 2*a* through 9) can be enhanced by the addition of recorder 410. (Recorder 410 can comprise hardware like that employed by post-delivery recorder 50 or that employed by common-day answering machines. Both recorder 410 and answering machines function to record what is herein described as voice information 289.)

An example of operation of recorder 410 will now be given. Circuitry 20 answers an incoming call and sends a message asking the caller to state their name. The caller responds, for example, "Kraymer". Simultaneous with the receipt of "Kraymer", answering circuitry 20 forwards that attained voice information 289 to recorder 410 which records the information. Subsequently, system 10 continues on with the process of delivering the exemplary "Kraymer" information to the user. In this example, the user is not home to receive the "Kraymer" information. (Additionally, the system includes a post-delivery recorder 50 but the caller has elected not to leave a message.) Accordingly, in this example, the user (upon returning home) visits his directing system 10. System 10 is providing an indication that recorder 410 has recorded information. The user can then prompt recorder 410 to play the recorded information and, thus, the user becomes informed that Kraymer called. (Recorder 410 can additionally supply information such as date and time. Attained voice information 289 can include the phone number of the caller which is then also recorded, or other. Recorder 410 can additionally mix the recorded voice information 289 with conventional Caller I.D. information.)

FIG. 2b additionally illustrates the first example of this second preferred embodiment (FIG. 2a) with signal provider 30 employing synthesized voice 298. An example of the first example of this second preferred embodiment employing synthesized voice 298 will now be given. Circuitry 20 answers an incoming call and sends a message asking the caller to state their name. The caller responds, for example, "Bozo the Clown". That attained information in the form of voice information 289 is forwarded to provider 30 from circuitry 20.

Provider 30 then employs voice recognition to convert information 289 into synthesized voice information 298. The synthesized voice 298 is then employed by provider 30 (in place of voice information 289) in the composing of composed audio signal 233. Signal 233 is then sent to loudspeaker 99.

Coinciding with provider 30 sending the signal 233 representative of the synthesized exemplary "Bozo the Clown", provider 30 signals alert signal provider 70. Signal provider 70 responds by providing a signal which operates loudspeaker 99 to broadcast an alert sound. The signal from provider 70 is coordinated with the exemplary "Bozo the Clown" signal information sent by provider 30 such that the combined result when broadcast from speaker 99 is a synthesized "Bozo the Clown" followed by a pause, a ring cadence, followed by a pause, "Bozo the Clown" followed by the pause, the ring cadence, and so on. The pause can be, for example, one second in duration, and the ring cadence can be, for example, two seconds in duration. (Upon a user answering telephone 27 or caller hang-up, system 10 resets.)

FIG. 2b additionally illustrates the first example of this second preferred embodiment (FIG. 2a) with signal provider 30 further configured to provide display signal 235 (in addition to composed audio signal 233).

An example of the embodiment of FIG. 2a providing display signal 235 will now be given. The first and second examples of operation previously given for the first example of this second preferred embodiment remain as described. However, upon receipt of information 289, provider 30 additionally employs voice recognition and converts information 289 into display signal 235. Signal 235 is then sent to display 230. If information 289 represents, for example, "Ross Doss", "Ross Doss" will be displayed in writing on display 230 (in addition to being broadcast out of loudspeaker 99).

(For any of the embodiments of system 10 herein disclosed in which provider 30 provides at least one of prescribed ring signal 232, prescribed audio signal 291, composed audio signal 233 or live audio signal 234, provider 30 can further be configured to additionally provide display signal 234.

Figure 2C:
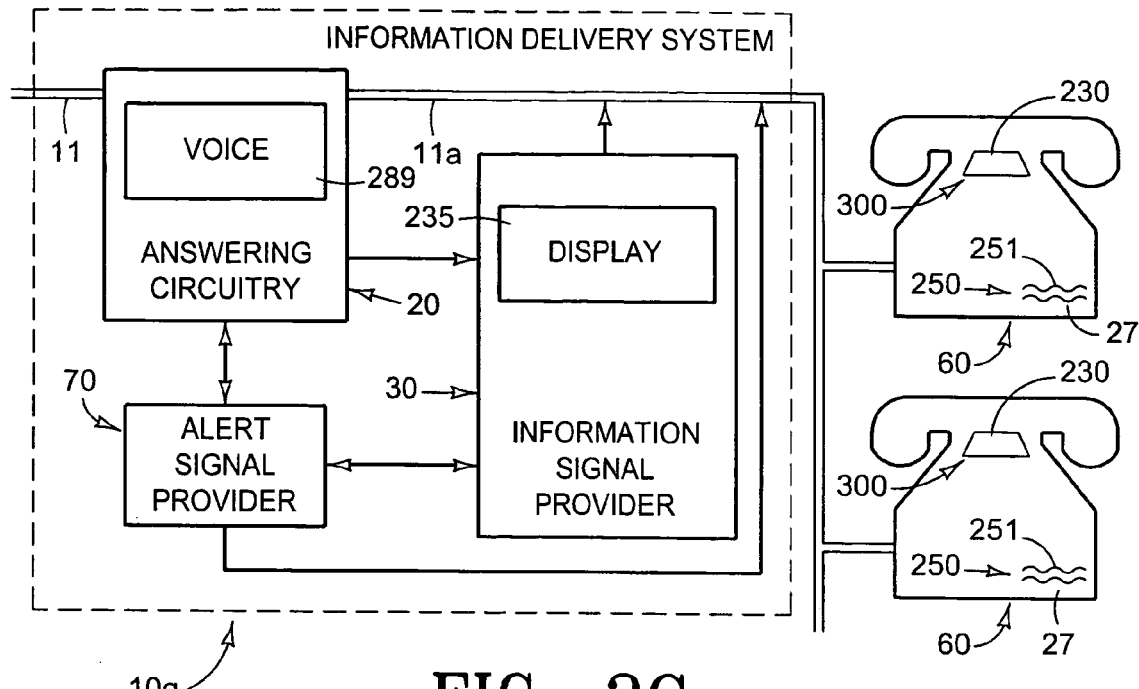

A second example of this second preferred embodiment is shown as system 10g in FIG. 2c. As shown, circuitry 20 of this example is configured to attain voice information 289. As shown, provider 30 of this example is configured to provide display signal 235.

An example of system operation of this second example of this second preferred embodiment will now be given. Operation begins when an incoming call is detected and, subsequently, answered by answering circuitry 20. Upon answering, circuitry 20 signals alert signal provider 70. Provider 70 in turn provides a signal which operates vibratory alert 251.

Also upon answering, circuitry 20 sends to the caller a message such as, "This is Suzy, whom can I say is calling?". The caller responds by speaking his name, for example, "Bad Ike" into the microphone of the telephone he calling from. The caller's response is attained by circuitry 20 in the form of voice information 289. Circuitry 20 forwards the attained information 289 to signal provider 30.

Upon receipt, provider 30 employs voice recognition and converts information 289 into display signal 235. Signal 235 is then sent to display 230 and at the same time alert provider 70 is signaled to discontinue the alert signal. The user, having been alerted as to the existence of an incoming call, can then read the exemplary displayed information "Bad Ike" from display 230 and decide whether to answer or not. (Upon a user answering telephone 27 or the caller hanging up, circuitry 20 resets the system.)

For any of the embodiments of system 10 herein described in which system 10 includes alert signal provider 70 (FIGS. 2a, 2b, 2c, 3a and 3b), provider 30 can be configured to provide display signal 235 in place of composed audio signal 233 or live audio signal 235. Alternately, when system 10 is configured such that the ring signal provided by service provider 121 is utilized (FIGS. 4a, 4b, 5, 6, 7 and 8), the provider 30 can be configured to provide display signal 235 in place of composed audio signal 233, or in place of live audio signal 234.

Figure 2D:
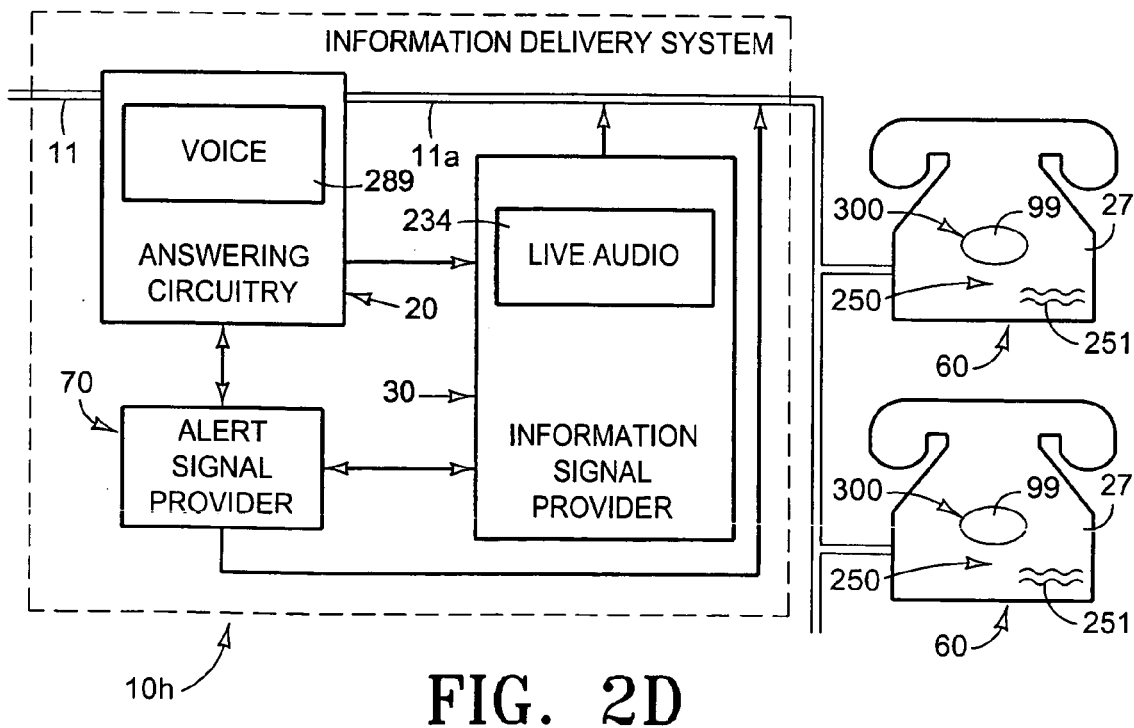

A third example of this second preferred embodiment is shown as system 10h in FIG. 2d. As shown, circuitry 20 of this example is configured to attain voice information 289. As shown, provider 30 of this example is configured to provide live audio signal 234.

A first example of system operation of this third example of this second preferred embodiment will now be given. Operation begins when an incoming call is detected and answered by answering circuitry 20. Upon answering the call, circuitry 20 then signals signal provider 70. Signal provider 70 responds by providing a signal which operates alert 250 (in this example, a vibrator alert 251), in which case alert 251 functions to alert the user by vibrating the telephone 27.

Also upon answering the call, circuitry 20 sends the exemplary message, "This is Suzy, who's calling?" to the caller. Upon completion of sending the message, circuitry 20 signals provider 70 to halt the operation of alert 251. In response to the message, the caller speaks his name, for example, "John Watts" into the microphone of the telephone he is calling from. The caller's response is attained in the form of voice information 289 by circuitry 20. Circuitry 20 forwards information 289 to information signal provider 30. Signal provider 30 forwards information 289, now constituting live audio signal 234, to loudspeaker 99 (or telephone receiver 78). Consequently, loudspeaker 99 broadcasts, the exemplary message "John Watts". The user can then consider the information and answer the call or not. (Upon a user answering telephone 27 or the caller hanging up, circuitry 20 resets the system. Alert 251 can additionally be provided concurrent with the broadcasting of the exemplary "John Watts" message.)

A second example of system operation of this third example of this second preferred embodiment will now be given. Operation begins when an incoming call is detected and answered by answering circuitry 20. Upon answering, circuitry 20 provides the caller with a message such as, "We'll be with you in a minute". Also upon answering, circuitry 20 signals alert provider 70. Provider 70 responds by providing an alert signal which operates alert 250 (for this example vibrator 251) to vibrate phone 27.

After a prescribed length of time, say fifteen seconds, provider 70 discontinues providing the alert signal and signals circuitry 20. In response, the exemplary message, "This is Suzy, whom can I say is calling?" is sent by circuitry 20 to the caller. The caller responds by speaking his name, for example, "Bob White" into the microphone of the telephone he is calling from. The caller's response is attained in the form of voice information 289 by circuitry 20 and forwarded to information signal provider 30. Provider 30 forwards information 289, a live audio signal 234, to operate loudspeaker 99. Consequently, (subsequent to the alerting period) the exemplary information "Bob White" is broadcast live from speaker 99 and the user can then consider the information and decide whether or not to answer. (Signal 234 can additionally or alternately operate telephone receiver 78. Upon a user answering telephone 27 or the caller hanging up, circuitry 20 resets the system.)

In summary, the examples of the second preferred embodiment (FIGS. 2a through 2d) operate by: Step(1) Answering a telephone call incoming from a service provider (or, when configured to reside at service provider 121: Intercepting a call from a caller to a user when en route through a service provider; Step(2) Attaining information input by a caller (attaining voice information 289); Step(3) Providing at least one signal to alert a user; and Step(4) Providing at least one signal to operate an information deliverer to deliver at least some of the attained information to a user (by providing at least one of: composed audio signal 233, display signal 235 or live audio signal 234).

Figure 3A:
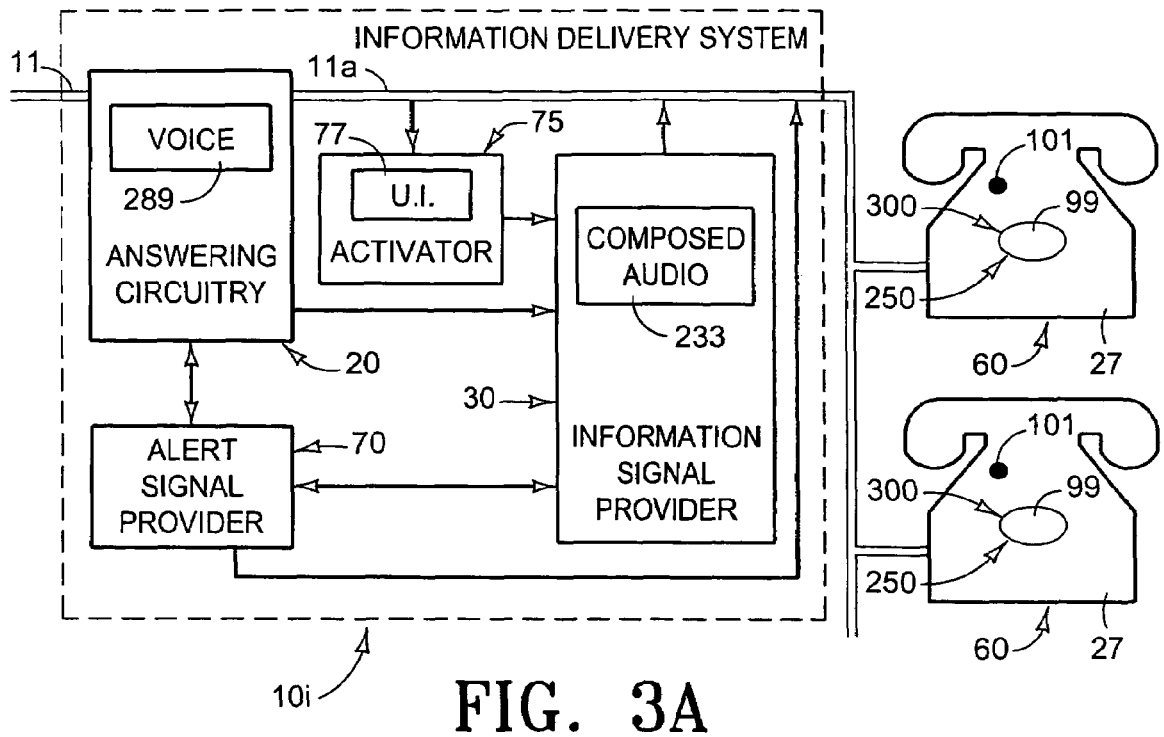
FIGS. 3a and 3b are block diagrammatic views depicting examples of a third preferred embodiment comprised of answering circuitry, an alert signal provider, an information signal provider and an activator.
Figure 3B:
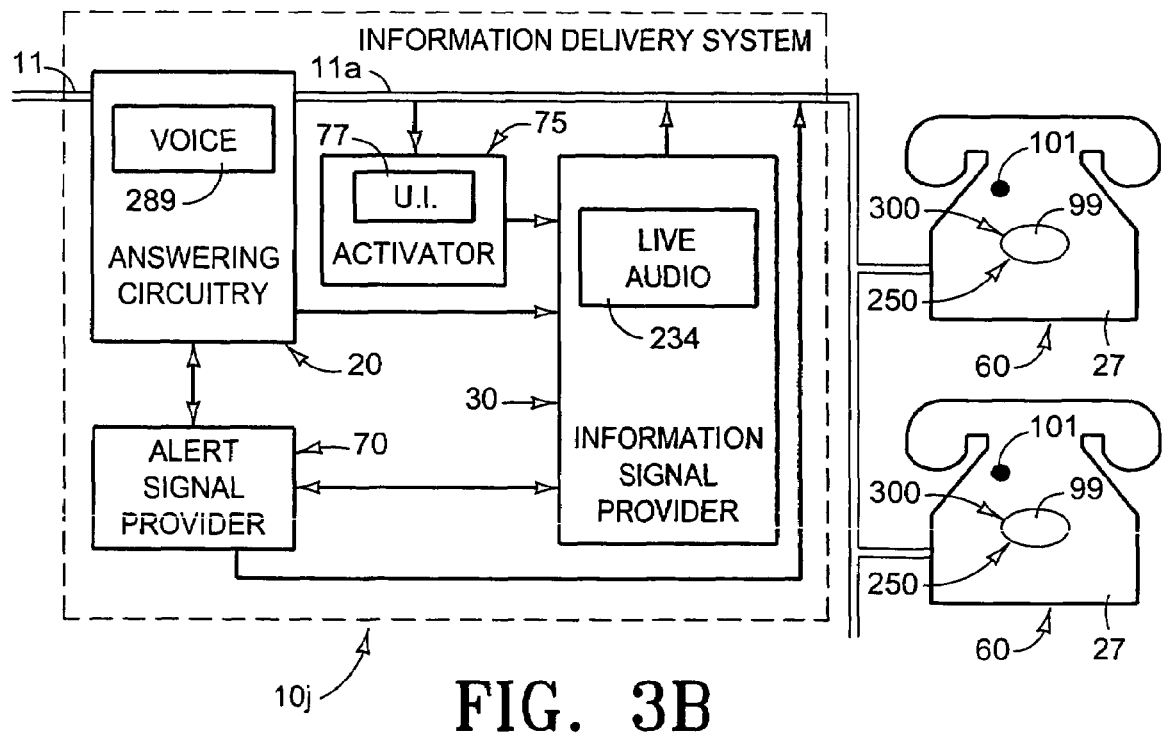

A third preferred embodiment of information delivery system 10 is illustrated in FIGS. 3a and 3b. This third preferred embodiment employs answering circuitry 20, information signal provider 30 and alert signal provider 70. Additionally, this embodiment employs an activator 75. (This third preferred embodiment can additionally employ post-delivery recorder 50, FIG. 1c; information recorder 410, FIG. 2b; initiator 85, FIG. 4a; delay 205, FIG. 5a; repeater 130, FIG. 6; stopper 195, FIG. 8; and enabler 195, FIG. 9.)

Activator 75 functions to receive instruction from a user to activate signal provider 30. Activator 75 employs a user interface (U.I.) 77. User interface 77 functions to receive instruction from a user. For example, the user provides the instruction to telephone 27. Telephone 27 sends the instruction to interface 77 via line 11a. (The instruction can be produced at telephone 27 in the form of a touchtone signal, an off-hook condition, a specialized control signal or other. Circuitry 20 disconnects line 11a from line 11 to prevent the touchtone signal from being heard at the caller's telephone or to prevent communicable connection between caller and user resulting from the off-hook condition.) Responsive to receiving the instruction, activator 75 signals information signal provider 30. The signal activates provider 30 to deliver information attained (or to be attained) by circuitry 20 to information deliverer 300.

A first example of this third preferred embodiment is shown as system 10i in FIG. 3a. As shown, circuitry 20 of this example is configured to attain voice information 289. As shown, provider 30 of this example is configured to provide composed audio signal 233.

An example of system operation of this first example of this third preferred embodiment will now be given. System operation begins when an incoming call is detected and answered by answering circuitry 20. A message, for example, "Who's calling?", is sent by circuitry 20 to the caller. The caller responds by speaking his name, for example, "John Bloomenberg" into the microphone of the telephone he is calling from. The caller's response is attained as voice information 289 by circuitry 20 and forwarded to information signal provider 30. Upon receipt, provider 30 stores information 289.

Upon attaining information 289, circuitry 20 also signals alert signal provider 70. Provider 70 responds by providing an alert signal which operates loudspeaker 99 to broadcast an alert sound. The user responds to the alert sound and pushes a control button 101 on telephone 27. Button 101 sends a signal to user interface 77. In response to the signal, activator 75 signals provider 30. Provider 30 responds by signaling provider 70 which discontinues sending the alert signal. Provider 30 further responds by sending the stored information, now constituting composed audio signal 233, to operate loudspeaker 99. Consequently, the exemplary message "John Bloomenberg" is broadcast from speaker 99 and the user can then decide whether to answer the call or not. (Signal 233 can additionally or alternately operate telephone receiver 78. As with all non-live audio information delivered, the stored information can alternately be delivered in a repeating fashion. Upon a user answering telephone 27 or the caller hanging up, circuitry 20 resets the system.)

A second example of this third preferred embodiment is shown as system 10j in FIG. 3b. As shown, circuitry 20 of this example is configured to attain voice information 289. As shown, provider 30 of this example is configured to provide live audio signal 234.

An example of system operation of this second example of this third preferred embodiment will now be given. Answering circuitry 20 detects and answers an incoming call. Upon answering, circuitry 20 provides the caller with a message such as, "We'll be with you in a minute". Upon answering, circuitry 20 also signals provider 70. Provider 70 responds by providing an alert signal which operates loudspeaker 99 to broadcast an alert sound. The user responds to the alert sound and pushes control button 101 on telephone 27. Button 101 sends a signal to interface 77. In response, activator 75 signals provider 30. Provider 30 responds by signaling provider 70. Provider 70 responds by discontinuing providing the alert signal and signaling circuitry 20. Circuitry 20 responds by sending a message such as, "This is Suzy, whom can I say is calling?". The caller responds by speaking her name, for example "Mary Hoe" into the microphone of the telephone she is using. The caller's response is attained as voice information 289 by circuitry 20 and forwarded to in formation signal provider 30. Provider 30 forwards information 289, a live audio signal 234, to operate loudspeaker 99. Consequently, the exemplary information "Mary Hoe" is broadcast live from speaker 99. (The information can additionally or alternately be broadcast from telephone receiver 78. Upon a user answering telephone 27 or the caller hanging up, circuitry 20 resets the system.)

In summary, the examples of the third preferred embodiment (FIGS. 3a and 3b) operate by: Step(1) Answering a telephone call incoming from a service provider (or, when configured to reside at service provider 121: intercepting a call from a caller to a user when en route through a telephone service provider); Step(2) Attaining information input by a caller (attaining voice information 289); Step(3) Providing at least one signal to alert a user; Step(4) Receiving instruction from the user, and Step(5) Providing at least one signal in response to the instruction received to operate an information deliverer to deliver at least some of the attained information to a user (by providing at least one of: composed audio signal 233, display signal 235 or live audio signal 234).

Figure 4A:
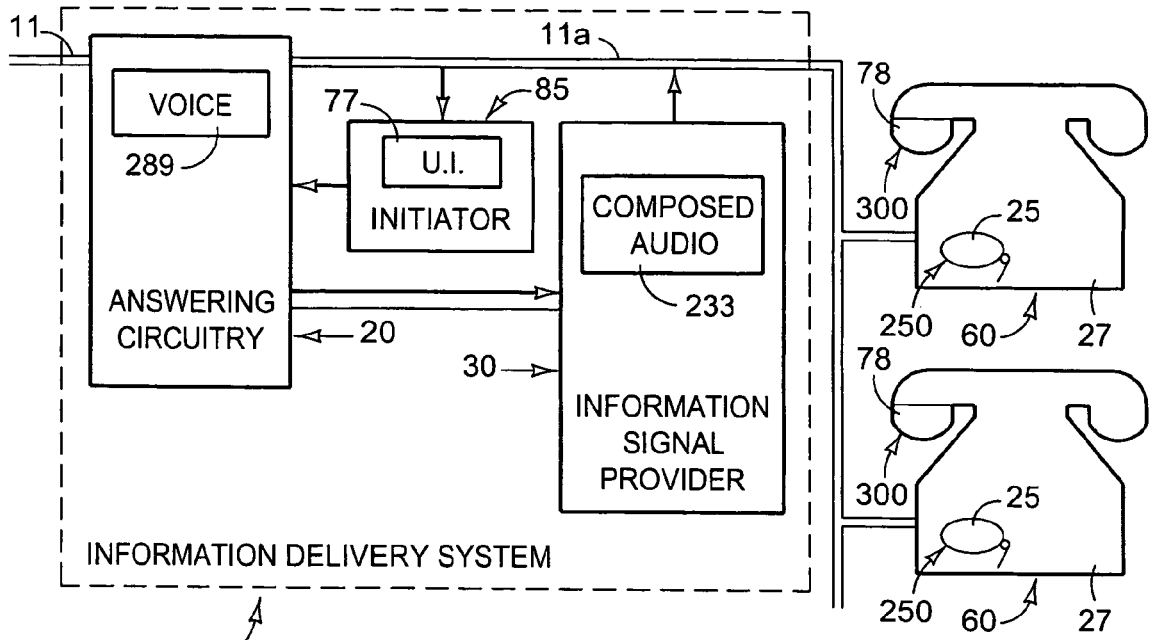
FIGS. 4a and 4b are block diagrammatic views depicting examples of a fourth preferred embodiment comprised of answering circuitry, an information signal provider and an initiator.
Figure 4B:
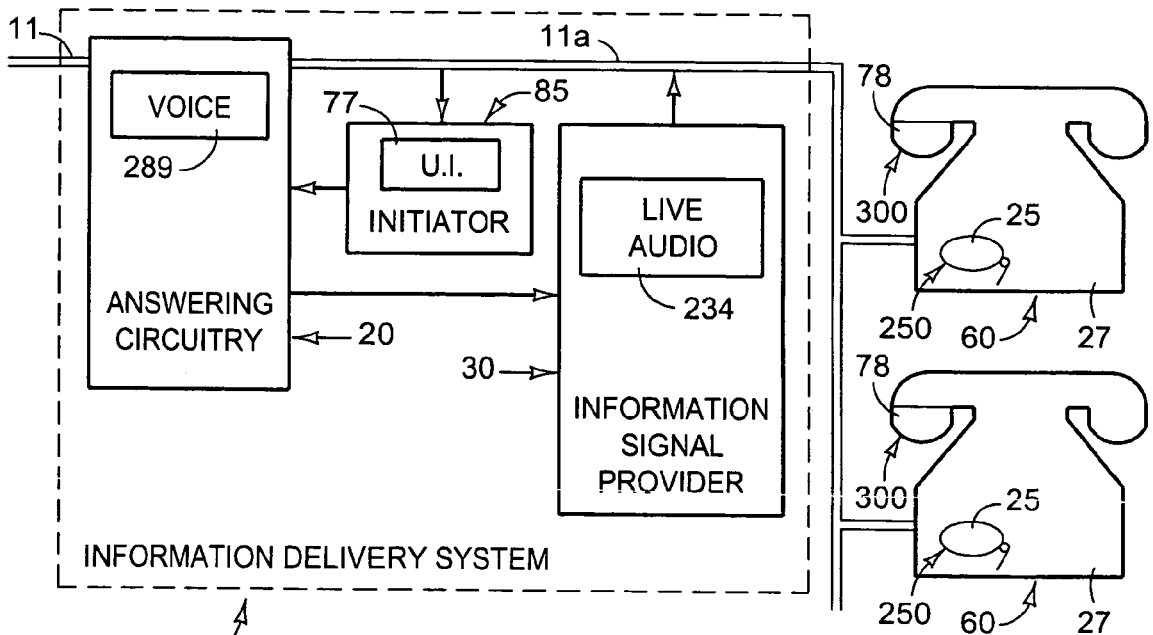

A fourth preferred embodiment of information delivery system 10 is illustrated in FIGS. 4a and 4b. This fourth preferred embodiment employs answering circuitry 20a and information signal provider 30. Additionally, this embodiment employs an initiator 85. (This fourth preferred embodiment can additionally employ post-delivery recorder 50, FIG. 1c; information recorder 410, FIG. 2b; initiator 85, FIG. 4a; delay 205, FIG. 5a; repeater 130, FIG. 6; stopper 195, FIG. 8; and enabler 195, FIG. 9.)

Initiator 85 (FIG. 4a) functions to receive instruction from a user to initiate answering circuitry 20a. Initiator 85 employs user interface (U.I.) 77. User interface 77 functions to receive instruction from a user. For example, the user provides the instruction to telephone 27. Telephone 27 sends the instruction to interface 77 via line 11a. (The instruction can be produced at telephone 27 in the form of a touchtone signal, an off-hook condition, a specialized control signal or other. Circuitry 20a disconnects line 11a from the incoming call line 11 to prevent communicable connection between caller and user prior to information delivery.)

A first example of this fourth preferred embodiment is shown as system 10k in FIG. 4a. As shown, circuitry 20a of this example is configured to attain voice information 289. As shown, provider 30 of this example is configured to provide composed audio signal 233.

An example of operation of this first example of this fourth preferred embodiment will now be given. A user's telephone is rung by the incoming ring signal provided by station 120 (FIG. 10a). The user responds to the ring by taking the telephone 27 "off the hook" (answering the phone). The off-hook condition of telephone 27 is detected by user interface 77. In response, initiator 85 signals circuitry 20a. Circuitry 20a responds by answering the incoming call and sending a message such as, "This is Suzy, whom can I say is calling?" to the caller. The caller responds by speaking his name, for example, "Terrible Tommy", into the microphone, of the telephone he is using. The caller's response is attained as voice information 289 and forwarded to signal provider 30.

Upon receipt, provider 30 configures information 289 into composed audio signal 233. Provider 30 then sends signal 233 to operate telephone receiver 78 (or loudspeaker 99 or both). Consequently, the exemplary message "Terrible Tommy" followed by a pause, "Terrible Tommy" followed by a pause, and so on, is broadcast out of receiver 78. The pause can be, for example, three seconds in duration. The user considers the information and decides to answer or not. (Upon a user answering telephone 27 or the caller hanging up, circuitry 20 resets the system.)

A second example of this fourth preferred embodiment is shown as system 10l in FIG. 4b. As shown, circuitry 20a of this example is configured to attain voice information 289. As shown, provider 30 of this example is configured to provide live audio signal 234.

An example of operation of this second example of this fourth preferred embodiment will now be given. A user's telephone is rung by the incoming ring signal provided by station 120. The user responds to the ring by taking the telephone 27 off-hook. The off-hook condition is detected at user interface 77. In response, initiator 85 signals circuitry 20a. Circuitry 20a responds by answering the incoming call and sending a message such as, "This is Suzy, whom can I say is calling?" to the caller. The caller responds by speaking his name, for example "Lucky Louie", into the microphone of the telephone he is using. The caller's response is attained as voice information 289 and forwarded to signal provider 30.

Upon receipt, provider 30 forwards information 289, now constituting live audio signal 234, to operate telephone receiver 78 (or loudspeaker 99 or both). The user hears the exemplary "Lucky Louie" and answers or not. (The system then resets.)

In summary, the examples of the fourth preferred embodiment (FIGS. 4a and 4b) operate by: Step(1) Receiving instruction from a user; Step(2) Answering a telephone call incoming from a service provider in response to the instruction received (or, when configured to reside at service provider 121: intercepting a telephone call when en route through a service provider in response to the instruction received); Step(3) Attaining information input by a caller (attaining voice information 289); and Step(4) Providing at least one signal to operate an information deliverer to deliver at least some of the attained information to a user (by providing at least one of: composed audio signal 233, display signal 235 or live audio signal 234).

Figure 5:
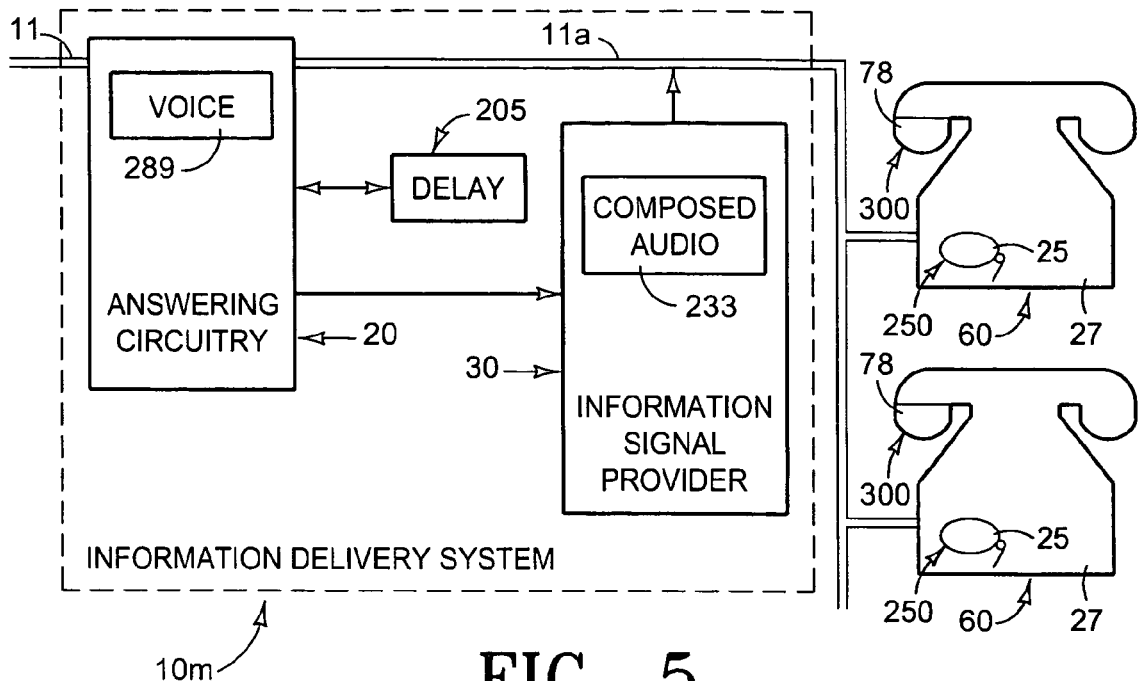
FIG. 5 is a block diagrammatic view depicting an example of a fifth preferred embodiment comprised of answering circuitry, an information signal provider and a delay.

An example of a fifth preferred embodiment of information delivery system 10 is shown as system 10m in FIG. 5. This fifth preferred embodiment employs answering circuitry 20 and information signal provider 30. Additionally, this embodiment employs delay 205. (This fifth preferred embodiment can additionally employ post-delivery recorder 50, FIG. 1c; information recorder 410, FIG. 2b; activator 75, FIG. 3a; initiator 85, FIG. 4a; stopper 195, FIG. 8; and enabler 190, FIG. 9.)

Delay 205 functions to delay answering circuitry 20. Delaying circuitry 20 allows time for the ring signal sent by station 120 to ring the user's telephone. Consequently, the user can elect to answer the call or can wait for system 10 to answer and provide information from the caller. (Delay 205 can be configured so that the period of time delay is pre-programmed or configured so the period can be set by the user.)

As shown for this fifth preferred embodiment, circuitry 20 is configured to attain voice information 289 and provider 30 is configured to provide composed audio signal 233.

An example of operation of this fifth preferred embodiment will now be given. System operation begins when an incoming call is detected by circuitry 20. Circuitry 20 then signals delay 205. In response, delay 205 implements a fifteen second time delay. When the time delay period has elapsed, delay 205 signals circuitry 20. In response, circuitry 20 answers the call and sends the caller a message such as, "This is Suzy, whom can I say is calling?". The caller responds by speaking his name, for example "Damion Dogbone", into the microphone of the telephone he is calling from. The caller's response is attained as voice information 289 by circuitry 20 and forwarded to signal provider 30.

Upon receipt, provider 30 composes information 289 into composed audio signal 233. Signal 233 is sent to and operates telephone receiver 78 (or loudspeaker 99 or both). Consequently, the exemplary "Damion Dogbone" followed by a pause, "Damion Dogbone" followed by a pause, and so on, is broadcast from receiver 78 for the user to hear. The pause can be, for example, two seconds in duration. The user considers the information and decides to answer or not (Circuitry 20 resets the system.)

In summary, the example of the fifth preferred embodiment of delivery system 10 (FIG. 5) operates by: Step(1) Delaying the answering of a telephone call incoming from a service provider (or, when configured to reside at service provider 121: Delaying the intercepting of a telephone call when en route through a service provider); Step(2) Answering the telephone call (or, when configured to reside at service provider 121: Intercepting the telephone call); Step(3) Attaining information input by a caller (attaining voice information 289); and Step(4) Providing at least one signal to operate an information deliverer to deliver at least some of the attained information to a user (by providing at least one of: composed audio signal 233 or display signal 235).

Figure 6:
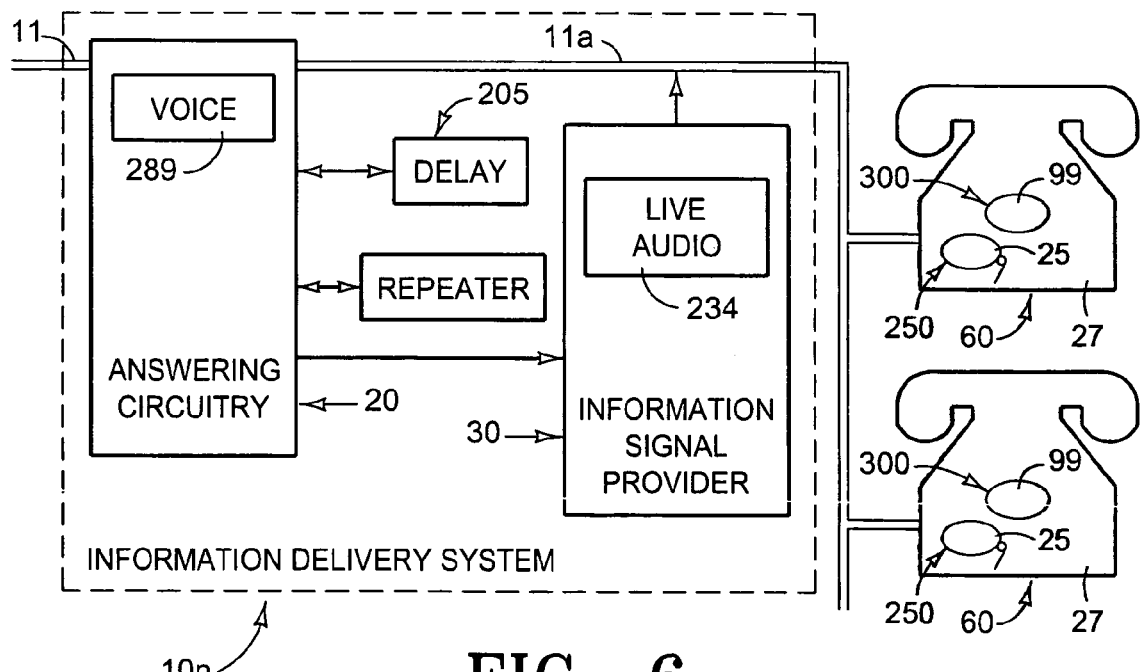
FIG. 6 is a block diagrammatic view depicting an example of a sixth preferred embodiment comprised of answering circuitry, an information signal provider, a delay and a repeater.

An example of a sixth preferred embodiment of information delivery system 10 is shown as system 10n in FIG. 6. This sixth preferred embodiment employs answering circuitry 20, signal provider 30 and delay 205. Additionally, this embodiment employs repeater 130. (This sixth preferred embodiment can additionally employ post-delivery recorder 50, FIG. 1c; alert signal provider 70, FIG. 2a; information recorder 410, FIG. 2b; activator 75, FIG. 3a; initiator 85, FIG. 4a; stopper 195, FIG. 8; and enabler 190, FIG. 9.)

Repeater 130 functions to prompt answering circuitry 20 to attain information from the caller a plurality of times. Repeater 130 can comprise a microprocessor with available memory, or other similar devices. (Repeater 130 can be configured so that the number of times the circuitry 20 is prompted is pre-programmed or configured so the number of times can be set by the user.)

As shown for this sixth preferred embodiment, circuitry 20 is configured to attain voice information 289 and provider 30 is configured to provide live audio signal 234.

An example of operation of this sixth preferred embodiment will now be given. System operation begins when an incoming call is detected by circuitry 20. Circuitry 20 then signals delay 205. In response, delay 205 implements a time delay. The time delay can be, for example, ten seconds in duration. When the time delay has elapsed, delay 205 signals circuitry 20. Circuitry 20 responds by answering the call and sending the caller the message such as, "This is Suzy, who's calling?". The caller responds by speaking his name, for example "Tommy Who", into the microphone of the telephone he is using. The caller's response is attained as voice information 289 by circuitry 20 and forwarded to information signal provider 30.

Upon receipt, provider 30 forwards the information, now constituting live audio signal 234, to operate loudspeaker 99. Upon completion of forwarding the information to provider 30, circuitry 20 signals repeater 130. Repeater 130 responds by prompting circuitry 20 to again send the exemplary message, "This is Suzy, who's calling?". Circuitry 20 again forwards the caller's response to provider 30 and, again, circuitry 20 signals repeater 130. Repeater 130 again responds by prompting circuitry 20 which again sends the exemplary message, "This is Suzy, who's calling?". This cycle continues until the user answers the call or the caller hangs up. Upon hearing the caller's response (e.g., "Tommy Who"), the user can decide whether to answer the call or not. Responsive to the answering or hang-up, the repeating operation of sending the caller the message is discontinued. (Circuitry 20 then resets the system.)

In summary, the example of the sixth preferred embodiment of delivery system 10 (FIG. 6) operates by: Step(1) Delaying the answering of a telephone call incoming from a service provider (or, when configured to reside at service provider 121: Delaying the interception of a telephone call when en route through a service provider); Step(2) Answering the telephone call (or, when configured to reside at service provider 121; Intercepting, the telephone call); Step(3) Attaining information input by a caller (attaining voice information 289); Step(4) Providing at least one signal to operate an information deliverer to deliver at least some of the attained information to a user (by providing live audio signal 234); and Step(5) Repeating the attaining of information and the providing of at least one signal.

An example of a seventh preferred embodiment of information delivery system 10 is shown as system 10o in FIG. 7. This seventh preferred embodiment employs answering circuitry 20, information signal provider 30 and delay 205 to delay answering circuitry 20. Additionally, this embodiment employs post-delivery recorder 50 to record post-delivery information input by the caller. (Recorder 50, shown in FIG. 1c, has previously been discussed. This seventh preferred embodiment can additionally employ alert signal provider 70, FIG. 2a; information recorder 410, FIG. 2b; activator 75, FIG. 3a; initiator 85, FIG. 4a; stopper 195, FIG. 8; repeater 130, FIG. 6; and enabler 190, FIG. 9.)

As shown for this seventh preferred embodiment, circuitry 20 is configured to attain voice information 289 and provider 30 is configured to provide live audio signal 234.

An example of operation of this seventh preferred embodiment will now be given. System operation begins when an incoming call is detected by circuitry 20. Circuitry 20 then signals delay 205. Delay 205 responds by implementing a time delay. The time delay can be, for example, twenty seconds in duration. When the time delay has elapsed, delay 205 signals circuitry 20. In response, circuitry 20 answers the call and sends the caller a message such as, "Who's calling please?". The caller responds by speaking his name (for example, "Eternal Defunct") into the microphone of the telephone he is calling from. The caller's response is attained as voice information 289 by circuitry 20 and forwarded to signal provider 30.

Upon receipt, provider 30 forwards information 289, now constituting live audio signal 234, to operate an information deliverer 300. At this time, circuitry 20 also sends a signal to post-delivery recorder 50. Recorder 50 times a predetermined duration, such as ten seconds, for example. When the predetermined duration has elapsed (with no answering by the user or hang-up by the caller) recorder 50 prompts circuitry 20. In response, circuitry 20 sends a message to the caller, for example, "Please leave a message". Recorder 50 then records any information left by the caller. (After the predetermined duration, recorder 50 also signals provider 30. In response, provider 30 stops sending signal 234. Subsequently, circuitry 20 resets the system.)

In summary, the example of the seventh preferred embodiment of delivery system 10 (FIG. 7) operates by: Step(1) Delaying the answering of a telephone call incoming from a service provider (or, when configured to reside at service provider 121: Delaying the interception of a telephone call when en route through a telephone service provider); Step(2) Answering the telephone call, (or, when configured to reside at service provider 121: Intercepting the telephone call); Step (3) Attaining information input by a caller (attaining voice information 289); and Step(4) Providing at least one signal to operate an information deliverer to deliver at least some of the attained information to a user (by providing live audio signal 234); and Step(5) Recording a post-delivery message from the caller.

An example of an eighth referred embodiment of information delivery system 10 is shown as system 1op in FIG. 8. This eighth preferred embodiment employs answering circuitry 20, information signal provider 30 and delay 205. Additionally, this embodiment employs stopper 195. (This eighth preferred embodiment can additionally employ post-delivery recorder 50, FIG. 1c; alert signal provider 70, FIG. 2a; information recorder 410, FIG. 2b; activator 75, FIG. 3a; initiator 85, FIG. 4a; repeater 130, FIG. 6; and enabler 190, FIG. 9.)

Stopper 195 functions to halt delivery of information. Stopper 195 halts delivery of information by at least one of: halting operation of information deliverer 300, halting operation of signal provider 30, halting operation of alert 250, halting operation of alert signal provider 70, or diverting the incoming call. Stopper 195 comprises user interface 77. User interface 77 functions to receive instruction from a user.

As shown for this eighth preferred embodiment, circuitry 20 is configured to attain voice information 289 and provider 30 is configured to provide live audio signal 234.

An example of operation of this eighth preferred embodiment will now be given. System operation begins when an incoming call is detected by circuitry 20. Circuitry 20 then signals delay 205. Delay 205 responds by implementing a predetermined time delay, such as, for example, a twelve second time delay. When the time delay has elapsed, delay 205 signals circuitry 20. In response, circuitry 20 answers the incoming call and sends the caller a message such as, "Please state your name and your company's name and please repeat this information until we answer." The caller can respond with, for example, "John with Stolz Industries" and continues to repeat this response into his telephone microphone. The caller's response is attained as voice information 289 by circuitry 20 and forwarded to information signal provider 30.

Upon receipt, provider 30 forwards the information 289, now constituting live audio signal 234, to operate speaker 99 (or telephone receiver 78 or both). Provider 30 provides live audio signal 234 until circuitry 20 detects a caller hang-up or an off-hook condition at telephone 27. From the exemplary "John with Stolz Industries" information broadcast out of speaker 99, the user has determined the identity of the caller and can determine that he does not wish to speak to the caller nor continue to hear the caller's response out of speaker 99. Consequently, the user can push control button 101 on telephone 27. Button 101 sends a signal to interface 77. In response, stopper 195 signals provider 30. Provider 30 responds by discontinuing forwarding the signal 234 to speaker 99. (In addition to, or in place of, halting operation of provider 30, stopper 195 can divert the incoming call by signaling circuitry 20 which responds by sending the caller a message. In addition to, or in place of, stopping operation of speaker 99, stopper 195 can divert the incoming call by signaling circuitry 20 which responds by disconnecting from the call. In addition to, or in place of, stopping operation of speaker 99, stopper 195 can divert the incoming call to post-delivery recorder 50. This embodiment can further include post-delivery recorder 50 and stopper 195 will thus signal recorder 50. In response, recorder 50 can record post-delivery message information 51 from the caller. In addition to, or in place of, stopping operation of speaker 99, this embodiment can further include alert signal provider 70 and stopper 195 can signal provider 70 which discontinues sending an alert signal.) Upon a user answering telephone 27 or the caller hanging up, circuitry 20 resets the system.

In summary, the example of the eighth preferred embodiment of delivery system 10 (FIG. 8) operates by: Step(1) Delaying the answering of a telephone call incoming from a service provider (or, when configured to reside at service provider 121: Delaying the interception of a telephone call when en route through a service provider); Step(2) Answering the telephone call (or, when configured to reside at service provider 121: intercepting the telephone call); Step(3) Attaining information input by a caller (attaining voice information 289); Step(4) Providing at least one signal to operate an information deliverer to deliver at least some of the attained information to a user (by providing live audio signal 234); and Step(5) Halting the delivery of information.

An example of a ninth preferred embodiment of information delivery system 10 is shown as system 10q in FIG. 9. This ninth preferred embodiment employs a plurality of information delivery systems, each delivery system 10 configured to attain information input by a caller and to deliver at least some of the information to a user.

The example of FIG. 9 illustrates this ninth preferred embodiment employing a combination of all sixteen of the examples of system 10 previously disclosed (FIGS. 1a, 1b, 1c, 1d, 2a, 2b, 2c, 2d, 3a, 3b, 4a, 4b, 5, 6, 7 and 8). Accordingly, this example of this ninth preferred embodiment comprises a combination of all components employed by those embodiments, as shown.

This example of embodiment nine also employs an enabler 190 (shown as E.). Enabler 190 functions to enable a user to engage and disengage at least one of the delivery systems 10. Enabler 190 includes a selector switch 191. As depicted in FIG. 9, selector switch 191 is shown as having a total of seventeen settings, one setting for each of the sixteen embodiments plus a "O" setting. However, a greater or lesser number of selections can be used depending on the number of variations included. For example, when the pointer on switch 191 has been set to point at "1a" (for example), operation of the embodiment shown in FIG. 1a is engaged through switch 191 (and all other embodiments are disengaged). When the pointer is pointed at "1b" (for example), operation of the embodiment shown in FIG. 1b is engaged (and the others are disengaged). When the pointer is pointed at "6" (for example), operation of the embodiment of FIG. 6 is engaged, and so on. When the pointer is pointed at "O", no embodiments are engaged. Consequently, when the pointer is pointed at "O" telephone calls placed to telephone 27 occur in the conventional manner as if there were no system 10, just a common-day telephone.

Enabler 190 can function, for example, in conjunction with a central processor. When enabler 190 engages one of the embodiments, the processor enacts an operating program appropriately controlling the components pertaining to that embodiment. When switch 191 is pointed at "O", enabler 190 disconnects circuitry 20 from detecting (and thus answering) an incoming call.

Enabler 190 can also be employed with any of the embodiments of system 10 disclosed, FIGS. 1a through 8. For each of those embodiments, enabler 190 functions to connect and disconnect just one embodiment. Consequently, for each of those embodiments, enabler 190 can, for example, employ a simple on/off toggle switch in place of selector switch 191. (Also, system 10 can be configured to include a signal provider enabler whereby the user can select the type of signal provided by provider 30, i.e. determining what type of information deliverer 300 is in service.)

The preferred embodiments of information delivery system 10 herein disclosed have been disclosed operating in conjunction with (but not inclusive of) communication device 60, information deliverer 300 and alert 250. Dotted line 88 in FIG. 8 illustrates that the eighth preferred embodiment (as well as all other disclosed embodiments) can additionally include one or more of device 60, deliverer 300 and alert 250.

The embodiments of the information delivery system 10 herein disclosed are shown operating in conjunction with telephones 27, telephone line 11 and service provider 121. Those embodiments also provide advantage to the user when operating in conjunction with cellular telephones, cellular telephone pathways and cellular service providers, or other.

The embodiments of delivery system 10 herein disclosed are shown as functional when located between service provider 121 and communication device 60 and also when located at service provider 121. Additionally, system 10 can be located at a communication device 60, such as telephones 27 (including cellular telephones). Also, system 10 can be located at the base of a cordless telephone or at the cordless telephone itself. Further, system 10 can be located in part at a service provider 121, with the remaining part located between service provider 121 and communication device 60 or located at communication device 60. For example, circuitry to intercept a call can be located at a cellular service provider and circuitry to attain and deliver information can be located at the associated cellular telephone. As yet another example, part of system 10 can be located at the base to a cordless telephone with the remainder of system 10 located at the cordless phone itself.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore claimed in any of its forms or modifications within the proper scope of the appended claims, appropriately interpreted in accordance with the doctrine of equivalents.

I claim:

1. A method for alerting a caller and a user as to the presence of an incoming telephone call, the method comprising:
   providing a signal using a sound selector to deliver a sound to alert a user as to the presence of an incoming call prior to any input response to the incoming call by the user;
   providing a signal using a backfeed, essentially simultaneous to the alerting and essentially throughout the alerting, to deliver to a caller the sound delivered to alert the user to indicate that the user is being alerted; and
   at least one of: enabling the user to choose the sound to be delivered using the sound selector, or enabling a sound to be selected to replace a sound chosen.

2. The method of claim 1 wherein said enabling the sound to be delivered to be chosen and a sound to be selected to replace the chosen sound comprises enabling the user to select the replacement sound.

3. The method of claim 1 wherein said providing a signal using a backfeed, essentially simultaneous to the alerting and essentially throughout the alerting, further comprises providing a signal to deliver a spoken word message to the caller.

4. The method of claim 1 wherein enabling the user to choose the sound to be delivered comprises storing the sound choice.

5. The method of claim 1 wherein providing a signal to deliver a sound to alert a user comprises providing a signal to deliver an alert sound designating an incoming call directed to one user out of a group of users, and, wherein the method further comprises governing delivery of an alert sound designating an incoming call directed to a user in the group other than the one user.

6. The method of claim 5 wherein governing delivery of an alert sound designating an incoming call directed to a user in the group other than the one user comprises enabling a user to govern delivery of the alert sound.

7. A method for alerting a caller and a user as to the presence of an incoming telephone call, the method comprising:
   Enabling one or more sounds to be chosen using a sound selector;
   storing the sound chosen;
   providing a signal using a sound selector to deliver one of the one or more sounds to alert a user as to the presence of an incoming call prior to any input response to the incoming call by the user; and
   providing a signal using a backfeed, essentially simultaneous to the alerting and essentially throughout the alerting, to deliver one of the one or more sounds to a caller to indicate that the user is being alerted, wherein enabling one or more sounds to be chosen further comprises at least one of: 1) enabling the user to choose at least one of the one or more sounds, or 2) enabling a sound to be selected to replace a sound chosen.

8. The method of claim 7 wherein said enabling a sound to be selected to replace a sound chosen comprises enabling the user to select the replacement sound.

9. The method of claim 7 wherein the sound delivered to the caller is essentially similar to the sound delivered to the user.

10. The method of claim 7 wherein providing a signal to deliver a sound to alert a user comprises providing a signal to deliver an alert sound designating an incoming call directed to one user out of a group of users, and, wherein the method further comprises governing delivery of an alert sound designating an incoming call directed to a user in the group other than the one user.

11. The method of claim 10 wherein governing delivery of an alert sound designating an incoming call directed to a user in the group other than the one user comprises enabling a user to govern delivery of the alert sound.

12. The method of claim 7 wherein said providing a signal using a backfeed, essentially simultaneous to the alerting and essentially throughout the alerting, further comprises providing a signal to deliver a spoken word message to the caller.

13. A method for alerting a caller and a user as to the presence of an incoming telephone call, the method comprising:
   enabling one or more sounds to be chosen using a sound selector;
   providing a signal using a sound selector to deliver an alert to alert a user as to the presence of an incoming call prior to any input response to the incoming call by the user; and
   providing a signal using a backfeed, essentially simultaneous to the alerting and essentially throughout the alerting, to deliver one of the one or more sounds to a caller to indicate that the user is being alerted, wherein enabling one or more sounds to be chosen further comprises at least one of: 1) enabling the user to choose at least one of the one or more sounds, or 2) enabling a sound to be selected to replace a sound chosen.

14. The method of claim 13 wherein said enabling a sound to be selected to replace a sound chosen comprises enabling the user to select the replacement sound.

15. The method of claim 13 wherein the sound delivered to the caller is essentially similar to the alert delivered to the user.

16. The method of claim 13 wherein providing a signal to deliver an alert to alert a user comprises providing a signal to deliver an alert designating an incoming call directed to one user out of a group of users, and, wherein the method further comprises governing delivery of an alert designating an incoming call directed to a user in the group other than the one user.

17. The method of claim 16 wherein governing delivery of an alert designating an incoming call directed to a user in the group other than the one user comprises enabling a user to govern delivery of the alert.

18. The method of claim 13 wherein said providing a signal using a backfeed, essentially simultaneous to the alerting and essentially throughout the alerting, further comprises providing a signal to deliver a spoken word message to the caller.

* * * * *